(12) United States Patent
Szymanski

(10) Patent No.: US 8,619,566 B2
(45) Date of Patent: Dec. 31, 2013

(54) DELAY AND JITTER LIMITED WIRELESS MESH NETWORK SCHEDULING

(76) Inventor: Tadeusz H. Szymanski, Toronto (CA)

( * ) Notice: Subject to any disclaimer, the term of this patent is extended or adjusted under 35 U.S.C. 154(b) by 280 days.

(21) Appl. No.: 13/124,019

(22) PCT Filed: Oct. 14, 2009

(86) PCT No.: PCT/CA2009/001466
§ 371 (c)(1),
(2), (4) Date: Apr. 13, 2011

(87) PCT Pub. No.: WO2010/043042
PCT Pub. Date: Apr. 22, 2010

(65) Prior Publication Data
US 2011/0222506 A1    Sep. 15, 2011

Related U.S. Application Data

(60) Provisional application No. 61/105,218, filed on Oct. 14, 2008.

(51) Int. Cl.
*G01R 31/08* (2006.01)
*H04L 12/28* (2006.01)

(52) U.S. Cl.
USPC .......................................... 370/230; 370/401

(58) Field of Classification Search
None
See application file for complete search history.

(56) References Cited

U.S. PATENT DOCUMENTS

| | | | |
|---|---|---|---|
| 7,164,667 B2 | 1/2007 | Rayment et al. | |
| 2003/0227901 A1* | 12/2003 | Kodialam et al. | 370/351 |
| 2006/0156169 A1* | 7/2006 | Shen et al. | 714/752 |
| 2007/0153702 A1 | 7/2007 | Khan et al. | |
| 2007/0237081 A1 | 10/2007 | Kodialam et al. | |
| 2007/0280261 A1* | 12/2007 | Szymanski | 370/395.4 |
| 2008/0247407 A1* | 10/2008 | Westphal et al. | 370/406 |
| 2009/0192769 A1* | 7/2009 | Dangui et al. | 703/2 |

OTHER PUBLICATIONS

Akyildiz and Wang, "A survey on wireless mesh networks," IEEE Radio Communications, Sep. 2005, pp. S23-S30.
Amano and Inoue, "Laboratory expriments of TDD/SDMA OFDM wireless backhaul in a downlink for hierarchical broadband wireless access systems," IEEE, 2008, (5 pages).

(Continued)

*Primary Examiner* — Eunsook Choi

(57) ABSTRACT

Schedule and channel assignment (SCA) in a wireless mesh network (WMN) is disclosed. A method includes: forming a representation of a sequence of permutation matrices from a n×n rate matrix. The entries of the rate matrix define the bandwidth of links between the n nodes of the WMN. Each of the permutation matrices represents active radio links between the n nodes. The sequence of permutation matrices defines a sequence of radio links to provide the desired bandwidth of links between said n nodes. Further, a representation of a sequence of partial permutation matrices corresponding to the sequence of permutation matrices is formed in such a way that each of the permutation matrices can be decomposed into a group of partial permutation matrices. Each of the partial permutation matrices in a group represents non-interfering radio links between the n nodes. In each timeslot, the n nodes are configured for radio transmission and reception in accordance with at least one of the partial permutation matrices in each group to transmit traffic between the n nodes. Example SCA can be used to provision longer-term guaranteed-rate backhaul traffic flows supporting multimedia services such as VOIP or IPTV between base-stations in a WMN, with near-minimal delay and jitter and near-perfect Quality-of-Service for every provisioned traffic flow.

21 Claims, 24 Drawing Sheets

(56) References Cited

OTHER PUBLICATIONS

Bertsekas and Gallager, "Chapter 5: Routing in Data Networks," Data Networks, 1999, Prentice-Hall, pp. 363-492.
Caire and Kumar, "Information theoretic foundations of adaptive coded modulation," Proceedings of the IEEE, Dec. 2007, vol. 95, No. 12, pp. 2274-2298.
Cao et al., "Multi-Hop wireless backhaul networks: a cross-layer design paradigm," IEEE Journal on Selected Areas in Communications, May 2007, vol. 25, No. 4, pp. 738-748.
Chrysos and Katevenis, "Weighted fairness in buffered crossbar scheduling." IEEE, Proc. of the Workshop on High Performance Switching and Routing (HPSR-2003), Torino, Italy, Jun. 2003, pp. 17-22.
Genc et al.,"IEEE 802.16j relay-based wireless access networks: an overview," IEEE Wireless Communications, Oct. 2008, pp. 56-63.
Hiertz et al., "Principles of IEEE 802.11s," IEEE, 2007, pp. 1002-1007.
IEEE Standard for Information technology—Telecommunications and information exchange between systems—Local and metropolitan area networks—Specific requirements, Part 11: Wireless LAN Medium Access Control (MAC) and Physical Layer (PHY) Specification, IEEE Std 802.11-2007.
IEEE Standard Local and metropolitan area networks, Part 16: Air Interface for Broadband Wireless Access Systems, IEEE Std 802.16-2009.
Iera et al., "Channel-aware scheduling for QoS and fairness provisioning in IEEE 802.16/WiMAX broadband wireless access systems," IEEE Network, Sep./Oct. 2007, pp. 34-41.
Jain et al., "Impact of interference on multi-hop wireless network performance," ACM Mobicom, 2003, pp. 1-22.
Jain et al., "Impact of interference on multi-hop wireless network performance," Wireless Networks, 2005, vol. 11, pp. 471-487.
Koutsopoulos and Tassiulas, "The impact of space division multiplexing on resource allocation: a unified treatment of TDMA, OFDMA and CDMA," IEEE Transactions on Communications, Feb. 2008, vol. 56, No. 2, pp. 260-269.
Srikanth et al., "Orthogonal frequency division multiple access: is it the multiple access system of the future?", AU-KBC Research Center, Anna University, Chennai, India, (22 pages).
"linprog—Solve linear programming problems", The MathWorks, Inc., retrieved Jul. 26, 2011, from http://www.mathworks.com/help/toolbox/optim/ug/linprog.html.
Prabhakar and McKeown, "On the speedup required for combined input- and output-queued switching," Automatica, 1999, vol. 35, pp. 1909-1920.
Roberts, "The internet is broken.", IEEE Spectrum, Jul. 2009, pp. 36-39.
Szymanski, "Bounds on end-to-end delay and jitter in input-buffered and internally-buffered IP networks," to appear in the IEEE Transactions on Communications, Nov. 2009, pp. 1-6.
Szymanski, "A Low-jitter guaranteed-rate scheduling algorithm for packet-switched IP routers," IEEE Transactions on Communications, Nov. 2009, vol. 57, No. 11, pp. 3446-3459.
Tassiulas, "Linear complexity algorithms for maximum throughput in radio networks and input queued switches," IEEE, 1998, pp. 533-539.
Tassiulas and Ephremides, "Stability properties of constrained queueing system sand scheduling policies for maximum throughput in multihop radio networks," IEEE Transactions on Automatic Control, Dec. 1992, vol. 37, No. 12, pp. 1936-1948.
Xergias et al., "Centralized resource allocation for multimedia traffic in IEEE 802.16 mesh networks," Proceedings of the IEEE, Jan. 2008, vol. 96, No. 1, pp. 54-63.
Zhao and Raychaudhuri, "Scalability and performance evaluation of hierarchical hybrid wireless networks," to appear IEEE Transactions on Networking, 2009, pp. 1-14.
International Search Report mailed Feb. 2, 2010, in relation to PCT Application No. PCT/CA2009/001466 filed Oct. 14, 2009.
Written Opinion mailed Feb. 2, 2010, in relation to PCT Application No. PCT/CA2009/001466 filed Oct. 14, 2009.

\* cited by examiner

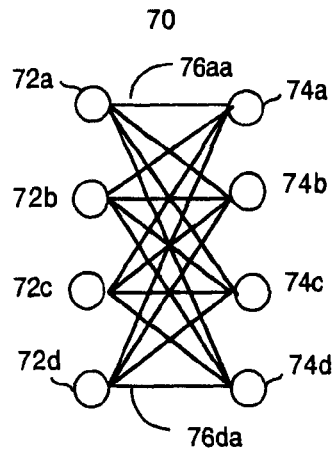
FIG. 5A.
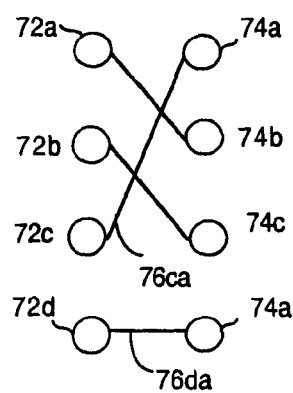
FIG. 5B.
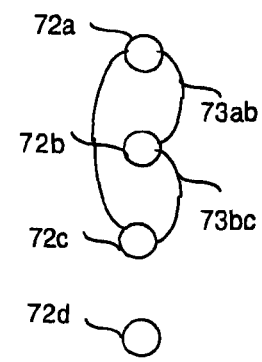
FIG. 5C.
$$R = \begin{bmatrix} 12 & 0 & 8 & 12 \\ 4 & 8 & 18 & 2 \\ 0 & 17 & 4 & 11 \\ 16 & 7 & 2 & 7 \end{bmatrix}$$
78a, 80
FIG. 5D.
$$P = \begin{bmatrix} 0 & 1 & 0 & 0 \\ 0 & 0 & 1 & 0 \\ 1 & 0 & 0 & 0 \\ 0 & 0 & 0 & 1 \end{bmatrix}$$
78b
FIG. 5E.
$[1 \ 2 \ 0 \ 3]$
FIG. 5F 100    [ FTS(1:F,1:N) ] = Schedule_Matrix_RFSMD (M, F, N)

102    assert (admissible(M,F,N) == 1)
104    FTS(1:F, 1:N) = Recursive_Schedule_Matrix (M, F, N)
108    return

FIG 9A :

110    Method  result = admissible(M, F,N)

112    result = 1;
114    for j = 1:N
116        if ( sum(M(j,1:N)) > F)
118            result = 0;
120        end;
122        if ( sum(M(1:N,j)) > F)
124            result = 0;
126        end;
128    end;
130    return

FIG 9B :

82     Method  FTS = Recursive_Schedule_Matrix(M, F,N)

83     if (F > 1)
84         Ma  = floor(M/2);
85         Mb = Ma;
86         Rem = M - 2*Ma;
87         [Ra, Rb] = partition_matrix (Rem, N);
88         Ma  = Ma + Ra;
89         Mb = Mb + Rb;
90         FTSa = Recursive_Schedule_Matrix(Ma, F,N);
91         FTSb = Recursive_Schedule_Matrix(Mb, F,N)
92         FTS = [FTSa FTSb]'
93     else
94         FTS= permutation_vector(M, N);
95     end;

FIG 9C :

FIG 9D $$\begin{matrix}136a\\\begin{bmatrix}6&0&4&6\\2&4&9&1\\0&8&2&5\\8&3&1&4\end{bmatrix}\end{matrix}=\begin{matrix}136b\\\begin{bmatrix}3&0&2&3\\1&2&5&0\\0&4&1&3\\4&2&0&2\end{bmatrix}\end{matrix}+\begin{matrix}136c\\\begin{bmatrix}3&0&2&3\\1&2&4&1\\0&4&1&2\\4&1&1&2\end{bmatrix}\end{matrix}$$

$$=\left(\begin{matrix}136d\\\begin{bmatrix}2&0&1&1\\0&1&3&0\\0&2&0&2\\2&1&0&1\end{bmatrix}\end{matrix}+\begin{matrix}136e\\\begin{bmatrix}1&0&1&2\\1&1&2&0\\0&2&1&1\\2&1&0&1\end{bmatrix}\end{matrix}\right)+\left(\begin{matrix}136f\\\begin{bmatrix}2&0&1&1\\0&1&2&1\\0&2&1&1\\2&1&0&1\end{bmatrix}\end{matrix}+\begin{matrix}136g\\\begin{bmatrix}1&0&1&2\\1&1&2&0\\0&2&0&1\\2&0&1&1\end{bmatrix}\end{matrix}\right)$$

FIG 9E $$\begin{matrix}136d\\\begin{bmatrix}2&0&1&1\\0&1&3&0\\0&2&0&2\\2&1&0&1\end{bmatrix}\end{matrix}=\begin{matrix}136h\\\begin{bmatrix}1&0&1&0\\0&1&1&0\\0&1&0&1\\1&0&0&1\end{bmatrix}\end{matrix}+\begin{matrix}136i\\\begin{bmatrix}1&0&0&1\\0&0&2&0\\0&1&0&1\\1&1&0&0\end{bmatrix}\end{matrix}$$

$$=\begin{matrix}136j\\\begin{bmatrix}1&0&0&0\\0&0&1&0\\0&1&0&0\\0&0&0&1\end{bmatrix}\end{matrix}+\begin{matrix}136k\\\begin{bmatrix}0&0&1&0\\0&1&0&0\\0&0&0&1\\1&0&0&0\end{bmatrix}\end{matrix}+\begin{matrix}136m\\\begin{bmatrix}1&0&0&0\\0&0&1&0\\0&0&0&1\\0&1&0&0\end{bmatrix}\end{matrix}+\begin{matrix}136n\\\begin{bmatrix}0&0&0&1\\0&0&1&0\\0&1&0&0\\1&0&0&0\end{bmatrix}\end{matrix}$$

$$FTS(0,...,3)=\begin{bmatrix}0&2&0&3\\2&1&2&2\\1&3&3&1\\3&0&1&0\end{bmatrix}$$
$$\phantom{FTS(0,...,3)=}\ \ 137(0)\ \ \ \ \ \ \ 137(3)$$

FIG 9F

138  FTS(0,...,15) =

$$\begin{bmatrix}0&2&0&3&|&0&3&2&3&|&0&2&0&3&|&0&3&2&3\\2&1&2&2&|&1&2&0&2&|&1&3&2&2&|&1&2&0&2\\1&3&3&1&|&2&1&3&1&|&2&1&3&1&|&3&1&1&-1\\3&0&1&0&|&3&0&1&0&|&3&0&1&0&|&2&0&3&0\end{bmatrix}$$

137(0)   137(3)        137(8)   137(11)        137(15)

200  Method [T, R] = Color_Permutation(P, N)

202  T = (-1)*ones(3,N)
204  R = (-1)*ones(3,N)

206  for u=1:N
208      for k = 1:3
210          v = P(j)
212          if (v > 0) and (T(k, v) == -1) and (R(k), u) == -1)
214              T(k,u) = v;
216              R(k,v) = u;
218              break;
220          end;
222      end;
224  end;

FIG. 10:

```
230  Method [T, R] = Color_2_Permutations(V1, V2, N)

232  T = (-1)*ones(6,N)
234  R = (-1)*ones(6,N)
236  num_matches(k) = 0, for 1<=k<=6
238  P(1,1:N)= V1(1:N)
240  P(2,1:N)= V2(1:N)

242  for p = 1:2
244      for j = 1:N
246          for k = 1:6
248              u = j
250              v = P(p,j)
252              if (T(k,v) == -1) and (R(k, u) == -1) and
254                  (T(k,u) == -1) and (R(k,v) == -1) and
256                  (num_matches(k) < N)
258                      T(k,u) = v;
260                      R(k,v) = u;
262                      num_matches(k) = num_matches(k) + 1;
264                      break;
266              end;
268          end;
270      end;
272  end;
```

FIG. 11A :

```
280  METHOD : [ T,R ] = Color_Augmenting_Path(P, NP, NC)

281  global N;

282  T = (-1)*ones(NC,N)
284  R = (-1)*ones(NC,N)
286  C = zeros*ones(NP,N)
288  num_matches(k) = 0, for 1<=k<=NC
290  [p, u, v] = [-1,-1,-1]
292  for p = 1:NP
294      for j = 1:N
296          if (u == -1) || (P(p,u) == -1) || (C(p,u) > 0)
298              [p, u, v] = find_uncolored_edge(P, C, p, u, v)
300          end;

302          if (p == -1) return  end;
304              c = find_unused_color(p, u, P, C);
306              T(c,u) = v;
308              R(c,v) = u;
310              C(p,u) = c;
312              u = v;
314          end;
316      end;
318  end;
```

FIG. 11B

```
320  method [p, u, v] = find_uncolored_edge(P,C, p, u,v)
321  global NP, N;
322  for p=1:NP
324      if (C(p,u) == 0) && (P(p,u) > -1)
326          v = P(p,u)
328          return
330      end;
332  end;
334  for p=1:NP
336      for u = 1:N
338          if (C(p,u) == 0) && (P(p,u) > -1)
340              v = P(p,u)
342              return
344          end;
346      end;
348  end;
350  [p,u,v] = [-1,-1,-1];
```

FIGURE 11C

```
360  method  c = find_unused_color(p, u, P, C)
361  global NC, NP;

362  free_color = ones(1;NC)
366  for p = 1;NP
368      if (P(p,u) > -1) && (C(p,u) > 0)
370          c =C(p,u)
372          free_color(c) = 0;
374      end;
376  end;

382  c = -1
384  for j=1:NC
386      if (free_color(j) == 1)
388          c =j;
390          return;
392      end;
394  end;
```

FIGURE 11D

```
400  method  c = find_unused_color2(p, ui, P, C)
401  global CM, E, NC, NP;

402  free_color = ones(1:NC)
403  for p = 1:NP
404      if (P(p,ui) > -1) && (C(p,ui) > 0)
405          free_color(C(p,ui)) = 0;
406      end;
407  end;

408  vi = P(p,ui);
409  e1 = M(ui,vi);
410  for e2 = 1:E
412      if (CM(e1,e2) == 1)
414          (u,v) = IM(e2);
416          for p =1:NP
418              if (P(p,u) == v) && (C(p,u) > 0)
420                  free_color(C(p,u)) = 0;
422              end;
424          end;
426      end
428  end;

430  c = -1
432  RP = perm(NC);
434  for j=1:NC;
436      nc = RP(j);
438      if (free_color(nc) == 1)
440          c = nc
442          return;
444      end;
446  end;
```

FIG. 11E:

```
450  method  c = find_unused_color3(p, ui, P, C)
451  global CM, E, NC, NP;

452  free_color = zero(1,NC)
453  for p = 1:NP
454          if (P(p,ui) > -1) && (C(p,ui) > 0)
455                  free_color(C(p,ui)) = 0;
456          end;
457  end;

458  vi = P(p,ui);
459  e1 = M(ui,vi);
460  for e2 = 1:E
462          if (CM(e1,e2) == 1)
464                  (u,v) = IM(e2);
466                  for p =1:NP
468                          if (P(p,u) == v) && (C(p,u) > 0)
470                                  free_color(C(p,u)) = CI(e1,e2);
442                          end;
474                  end;
476          end
478  end;

480  [SL, IL] = sort(free_color, 'ascend');
482  c = -1;
484  for j=1:NC;
486          nc = EL(j);
488          if (free_color(nc) <= THRESHOLD)
490                  c = nc
492                  return;
494          end;
496  end;
```

FIG. 11F:

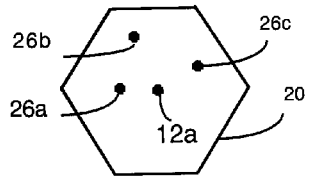
FIG. 12A.
|  | 12a | 26a | 26b | 26c |
|---|---|---|---|---|
| 12a | 0 | 4 | 7 | 3 |
| 26a | 2 | 0 | 0 | 0 |
| 26b | 9 | 0 | 0 | 0 |
| 26c | 5 | 0 | 0 | 0 |
FIG 12B.
|  | 12a | 26a | 26b | 26c |
|---|---|---|---|---|
| 12a | 0 | 4 | 7 | 3 |
| 26a | 2 | 0 | 2 | 5 |
| 26b | 9 | 3 | 0 | 1 |
| 26c | 5 | 3 | 1 | 0 |
FIG. 12C.
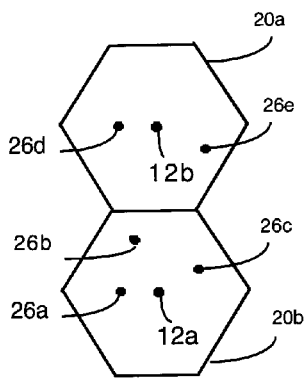
FIG. 13A.
|  | 12a | 26a | 26b | 26c | 12b | 26d | 26e |
|---|---|---|---|---|---|---|---|
| 12a | 0 | 4 | 7 | 3 | 8 |  |  |
| 26a | 2 | 0 | 0 | 0 |  |  |  |
| 26b | 9 | 0 | 0 | 0 |  |  |  |
| 26c | 5 | 0 | 0 | 0 |  |  |  |
| 12b | 10 |  |  |  | 0 | 6 | 8 |
| 26d |  |  |  |  | 3 | 0 | 0 |
| 26e |  |  |  |  | 7 | 0 | 0 |
FIG 13B.
|  | 12a | 26a | 26b | 26c | 12b | 26d | 26e |
|---|---|---|---|---|---|---|---|
| 12a | 0 | 4 | 7 | 3 | 8 |  |  |
| 26a | 2 | 0 | 2 | 5 |  |  |  |
| 26b | 9 | 3 | 0 | 1 |  |  |  |
| 26c | 5 | 3 | 1 | 0 |  |  |  |
| 12b | 10 |  |  |  |  | 6 | 8 |
| 26d |  |  |  |  | 3 | 0 | 2 |
| 26e |  |  |  |  | 7 | 3 | 0 |
FIG. 13C.

| | 12a | 12b | 12c | 12d |
|---|---|---|---|---|
| 12a | 0 | 8 | 4 | 0 |
| 12b | 12 | 0 | 4 | 4 |
| 12c | 8 | 3 | 0 | 4 |
| 12d | 0 | 6 | 5 | 0 |

FIG 15E:

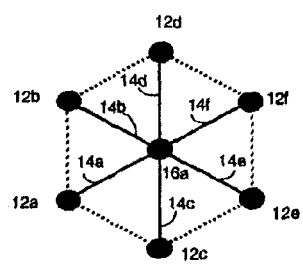
FIG 16A:
| | 12a | 12b | 12c | 16a | 12d | 12e | 12f |
|---|---|---|---|---|---|---|---|
| 12a | 0 | r(a,b) | r(a,c) | 4 | 0 | 0 | 0 |
| 12b | r(b,a) | 0 | 0 | 8 | r(b,d) | 0 | 0 |
| 12c | r(c,a) | 0 | 0 | 16 | 0 | r(c,e) | 0 |
| 16a | 24 | 24 | 36 | 0 | 48 | 36 | 24 |
| 12d | 0 | r(d,b) | 0 | 16 | 0 | 0 | r(d,f) |
| 12e | 0 | 0 | r(e,c) | 12 | r(e,d) | 0 | r(e,f) |
| 12f | 0 | 0 | 0 | 8 | r(f,d) | r(f,e) | 0 |
FIG 16B:
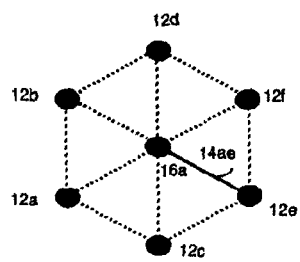
FIG. 17A
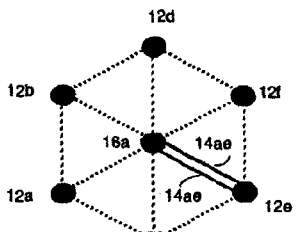
FIG 17B
| | 16a | 12e |
|---|---|---|
| 16a | 0 | r(a,e) |
| 12e | r(e,a) | 0 |
FIG 17C

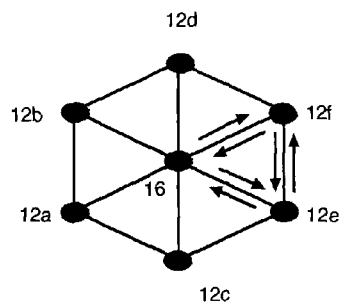
FIG 18A:
| | 12a | 12b | 16 |
|---|---|---|---|
| 12a | 0 | r(a,b) | r(a,16) |
| 12b | r(b,a) | 0 | r(b,16) |
| 16 | r(16,a) | r(16,b) | 0 |
FIG 18B
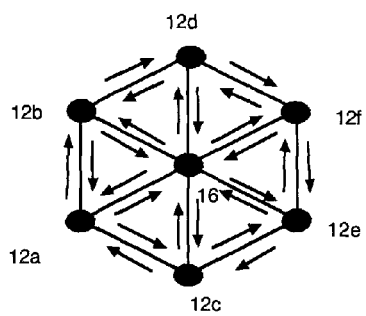
FIG. 19A
| | 12a | 12b | 12c | 16 | 12d | 12e | 12f |
|---|---|---|---|---|---|---|---|
| 12a | 0 | r(a,b) | r(a,c) | r(a,16) | 0 | 0 | 0 |
| 12b | r(b,a) | 0 | 0 | r(b,16) | r(b,d) | 0 | 0 |
| 12c | r(c,a) | 0 | 0 | r(c,16) | 0 | r(c,e) | 0 |
| 16 | r(16,a) | r(16,b) | r(16,c) | 0 | r(16,d) | r(16,e) | r(16,f) |
| 12d | 0 | r(d,b) | 0 | r(d,16) | 0 | 0 | r(d,f) |
| 12e | 0 | 0 | r(e,c) | r(e,16) | r(e,d) | 0 | r(e,f) |
| 12f | 0 | 0 | 0 | r(f,16) | r(f,d) | r(f,e) | 0 |
FIG. 19B:

DELAY AND JITTER LIMITED WIRELESS MESH NETWORK SCHEDULING

CROSS-REFERENCE TO RELATED APPLICATIONS

This application is a national filing of International Application No. PCT/CA2009/001466, filed on Oct. 14, 2009, entitled "DELAY AND JITTER LIMITED WIRELESS MESH NETWORK SCHEDULING", listing T. H. Szymanski as the inventor which claims priority from U.S. Provisional Patent Application Ser. No. 61/105,218 (incorporated herein by reference and referred to as "the '218 provisional"), filed on Oct. 14, 2008, entitled "METHOD AND APPARATUS TO SCHEDULE PACKETS THROUGH A WIRELESS MESH NETWORK WITH NEAR MINIMAL DELAY AND JITTER," and listing T. H. Szymanski as the inventor.

FIELD OF THE INVENTION

The present invention relates generally to wireless networks, and more particularly to the scheduling of traffic in wireless mesh networks, methods and systems.

BACKGROUND OF THE INVENTION

Infrastructure multihop Wireless Mesh Networks (denoted WMNs hereafter) represent a technology to deploy wireless broadband services in a relatively inexpensive manner. A WMN consists of a collection of geographically-fixed wireless nodes which provide the infrastructure for wireless access to the global Internet over a relatively large geographic area. A WMN can provide wireless services to both fixed residential end-users and to mobile end-users. WMNs are described in a paper by I. Akyildiz et al, "A Survey on Wireless Mesh Networks", IEEE Radio Communications, pp. S23-S30, September 2005, which is hereby incorporated by reference. Scheduling in WMNs is described in a paper by Min Cao et al, "Multi-Hop Wireless Backhaul Networks: A Cross-Layer Design Paradigm", IEEE Journal Selected Areas of Communications, Vol. 24, No. 4, May 2007, which is hereby incorporated by reference.

Several wireless network standards exist, including 3G, Long Term Evolution (LTE), the IEEE 802.16 WiMAX standards and the IEEE 802.11 WiFi standards. Resource allocation in mesh networks using the WiMax standard is summarized in the paper by S. Xergias et al, "Centralized Resource Allocation for Multimedia Traffic in IEEE 802.16 Mesh Networks", Proc. IEEE, Vol. 96, Issue 1, pp. 54-63, 2008, which is hereby incorporated by reference. Extensions of the IEEE 802.11 WiFi Standard to include mesh networking are described in the paper by G. Hiertz et al, entitled "Principles of IEEE 802.11s", Proc. IEEE Computer Comm. and Networks Conference, 2007, pages 1002-1007 which is hereby incorporated by reference.

Each standard uses a different terminology for similar concepts. The IEEE 802.11 WiFi standard describes a wireless router as an 'Access Point', while the IEEE 802.16 WiMax standard describes a wireless router a 'Base-Station'. In this document a generic model of a WMN network is used, which can use any of several underlying radio technologies. There are 2 types of wireless nodes in a generic WMN model, the Gateway Base-Stations (GS) and regular Base-Stations (BS). A GS has a wired connection to the Internet and acts as a gateway to the Internet. It can represent a WiMAX Base-station with a wired connection to the Internet, or an 802.11 Access Point with a wired connection to the Internet, or a 3G or LTE node with wired access to the Internet. The end-users of the infrastructure will be called Stationary Subscriber Stations (SSSs) such as homes, and Mobile Subscriber Stations (MSSs) such as cell phones. WMNs support two types of traffic, referred to herein as 'Backhaul' traffic between the infrastructure nodes, and 'End-User' traffic which is delivered directly to/from an end-user. A wireless mesh network that manages both backhaul traffic and end-user traffic is described in U.S. Pat. No. 7,164,667 B2, entitled "Integrated Wireless Distribution and Mesh Backhaul Networks", January 2007, which is hereby incorporated by reference. (This patent calls 'End-User' traffic the 'Distribution' traffic.)

A BS does not have a wired connection to the Internet, and must perform routing or forwarding functions for backhaul traffic, where it receives a packet, determines a suitable outgoing link, and then forwards the packet to another node, either a GS or another BS. The GSs and BSs in the WMN have geographically fixed locations, and are geographically positioned by a service provider to provide high-quality radio link between nodes. The nodes may be positioned to maximize Line-of-Sight communications, or to have good multipath reflection characteristics between large statically positioned objects (ie buildings, bridges, retaining walls) to enable good reception. In an infrastructure WMH the radio links exist between stationary nodes, where the channel degradation found in mobile nodes does not exist. The addition of relay stations and micro-basestations (described ahead) will ensure that all infrastructure radio links have an acceptably high quality. As a result, the quality of infrastructure WMN radio links is very good and will change relatively slowly in time, primarily due to weather or the ionosphere.

A Relay Station (RS) is a simplified BS. It accepts a packet in one time-slot, and typically forwards the packet to another node in a subsequent time-slot. The next node may be a GS, BS, or another RS. In the literature, a RS is often defined between 2 fixed nodes. In our WMN model, a RS can forward packets between 2 dedicated nodes, or it can perform limited routing or forwarding, where it examines a packet header and selects an outgoing link accordingly. In our generic WMN model, a relay station may use radio links which must be scheduled. Relay networks are described in the paper by V. Genc et al, "IEEE 802.16J Relay-Based Wireless Access Networks: An Overview", IEEE Wireless Communications, October 2008, pp. 56-63, which is hereby incorporated by reference.

The performance of wireless access networks may be improved by shrinking the cell sizes found in traditional systems to create 'micro-cells", "pico-cells" or "femto-cells". Hierarchical or hybrid WMNs have recently been proposed where conventional Base-Stations are augmented with 'Micro-Base-Stations' (mBSs), which operate in smaller micro-cells. These mBSs require less transmit power and can achieve higher data rates to nearby destinations. A mBS may receive packets from a nearby BS, GS or RS, and typically delivers these to end-users which are nearby. It also receives packets from the end-users which are nearby, and delivers these to a nearly BS, GS or RS. A hierarchical WMN with mBSs is described in the paper by Y. Amano, et al, "Laboratory Experiments of TDD/SDMA OFDM Wireless Backhaul in a Downlink for Hierarchical Broadband Wireless Access Systems", IEEE 2008, which is hereby incorporated by reference. Hybrid WMNs are also described in the paper by S. Zhao et al, "Scalability and Performance Evaluation of Hierarchical Hybrid Wireless Networks", IEEE Transactions on Networking, to Appear, 2009, which is hereby incorporated by reference.

The nodes (GS, BS, RS, mBS) and the radio links available between these nodes can be used to create a graph model of the infrastructure WMN denoted G(V,E), where V represents the set of nodes, and E represents the set of directed edges. Hereafter, we will not distinguish between Gateway Base-Stations, Base-Stations, Relay-Stations and micro-Base-Stations: They all will be referred to as BSs or nodes. The movement of traffic between BSs is called 'Backhauling'. Typically, backhauling involves moving relatively large amounts of traffic from the global IP network to the nodes in the WMN, and conversely. In the graph model, a directed wireless link between a pair of nodes is represented by a directed edge in the graph. Edges may be active or inactive in each time-slot. An edge must be assigned a 'radio channel' if it is active. A 'radio channel' utilizes some amount of the frequency spectrum in the physical neighborhood of the active edge. To move large amounts of backhaul traffic between the nodes in a WMN efficiently, the transmission of the traffic between the nodes in a WMN may be scheduled in a TDMA scheduling frame, and the active edges must be assigned non-conflicting radio channels.

Multiple Access Techniques

Radio systems typically use three different techniques to enable multiple users to access a shared medium, Time Division Multiple Access (TDMA), Frequency Division Multiple Access (FDMA), and Code Division Multiple Access (CDMA). More recently, Space Division Multiple Access (SDMA) has become feasible. The concepts of TDMA, OFDMA, CDMA and SDMA are described in the paper by I. Koutsopoulos et al, "The Impact of Space Division Multiplexing on Resource Allocation: A Unified Treatment of TDMA, OFDMA and CDMA", IEEE transactions on Communications, Vol. 56, No. 2, February 2008, which is hereby incorporated by reference.

In a TDMA system, the time axis is divided into time-slots, where a time-slot has sufficient duration to allow a fixed-sized packet to be transferred between two nodes over a radio channel. The IEEE 802.16 WiMax standard and the IEEE 802.11a/g/n WiFi standard use a subclass of FDMA called Orthogonal FDMA or OFDMA. In the OFDMA technology, the wide-band frequency spectrum is divided into many narrow-band subcarriers, which are substantially orthogonal since they are appropriately spaced. Typically, the subcarriers can be grouped into multiple logical orthogonal radio 'sub-channels'. Multiple sub-channels can be assigned to multiple users, thereby allowing multiple access in the frequency domain. The OFDMA technology is summarized in an article by S. Srikanth et al, "Orthogonal Frequency Division Multiple Access: Is it the Multiple Access System of the Future", AU-KBC Research Center, Anna University, Chennai, India, which is hereby incorporated by reference.

According to the paper by Srikanth et al, an OFDMA system may partition a wide-band spectrum into 1680 narrow-band subcarriers, which can be grouped into 24 orthogonal radio sub-channels with 70 subcarriers each. These 24 sub-channels can be allocated to a single user or to multiple (up to 24) distinct users. The sub-channels may have substantially the same capacity and are relatively orthogonal and are relatively free of interference. In a combined TDMA/OFDMA system, multiple users can transmit over multiple orthogonal logical sub-channels in the same time-slot. In a wireless network using TDMA/FDMA or TDMA/OFDMA, the network model G(V,E) has distinct features. A node may have up to K radio transmitter/receiver modules (transceivers), allowing it to access up to K distinct OFDMA radio sub-channels in each time-slot.

In a CDMA system, each node multiplies every bit in its bit-stream by a fixed bit-sequence (code) before transmission. The net affect is that the transmission from one node is spread with relatively low power over a wide frequency range. A receiving node correlates its received signal with the same code to extract the transmission. Codes are chosen to be substantially orthogonal, so that the correlation of any two different codes yields noise which can be filtered. In a combined TDMA/CDMA system, multiple users can transmit over multiple orthogonal CDMA channels in one time-slot. A node may have up to K transceivers, allowing it to access up to K substantially orthogonal CDMA radio channels in each time-slot.

Recently, Space Division Multiple Access (SDMA) has emerged as a feasible technology. In a SDMA system, Directional Antennae systems are used. A transmitting or receiving node may utilize multiple antennas in an 'antenna array'. A transmitting node may use beamforming algorithms to direct its transmissions along a particular direction. The antenna weights must be precomputed given the preferred direction and the number of antennas. Similarly, a receiving node may use beamforming algorithms to focus its receptions along a particular direction and to null out interference.

Recently, Multiple Input Multiple Output (MIMO) technologies have been developed. In a MIMO Directional Antenna system, each transmitter and each receiver have an antenna array. MIMO has the potential to offer significant increases in wireless system performance. MIMO technologies can support spatial reuse, where the same radio channel can be reused to support multiple transmissions between different pairs of nodes in the same physical region. To achieve the SDMA, both the transmitters and receivers must precompute antennae weights to strengthen the preferred signal, and to weaken the unwanted signals. A prerequisite to achieving the full potential of MIMO technologies in a WMN is that the pairs of communication nodes are identified in advance, allowing for the precomputation of transmission powers and antenna weights for all the communicating nodes. An algorithm for precomputing the antenna parameters for MIMO technology in a WMN are described in the paper by Min Cao referenced earlier.

End-User Traffic Delivery

The delivery of packets from the infrastructure nodes to the end-users over the last hop (both the uplink and downlink) must be included into the above infrastructure WMN model. The traffic involving the ultimate end-users will be called 'End-User' traffic. It is often called 'Point-to-Multipoint' traffic in the literature. In our network model, the end-users are called the Mobile Subscriber Stations (MSSs) and Stationary Subscriber Stations (SSSs). Hereafter, both types of end-users will also be denoted as 'Subscriber Stations' (SSs). The uplink and downlink wireless communication channels between BSs and end-users can be represented by a $2^{nd}$ class of radio edge in the network model G(V,E). The quality of these edges may be transient due to the effects of end-user mobility. When communicating with a mobile end-user in system using TDMA, a BS may use Opportunistic Scheduling or Channel-Aware scheduling, where a mobile end-user is typically selected for communications in a time-slot based upon the recent radio channel quality. In a particular time-slot, the communications may be enabled to mobile end-users whose radio channel quality is high and above the recent average channel quality. Channel-aware scheduling is described in a paper by A. Iera et al, entitled "Channel-Aware QoS and Fairness Provisioning in IEEE 802.16/WiMAX Broadband Wireless Access Systems", IEEE Network, September/October 2007, which is hereby incorporated by reference.

End-user traffic can be scheduled separately from the backhaul, by allocating a distinct set of orthogonal radio channels (or sub-channels) for backhaul traffic and for end-user traffic. For example, in an OFDMA system with 24 orthogonal sub-channels, 18 subchannels may be reserved for backhauling (ie inter-BS communications) and 6 subchannels may be reserved for end-user delivery (ie BS-SSS or BS-MSS communications). Hereafter, an OFDMA subchannel will be referred to as a channel. Alternatively, end-user traffic and backhaul traffic may share the same channels. In this case, time-slots in a scheduling frame may be pre-allocated for backhaul and end-user traffic.

The Problems

The multi-hop nature of WMNs leads to several technical challenges. Backhaul capacity and scalability are critical requirements for WMNs. To increase backhaul capacity, wireless routers can exploit multiple wireless transceivers, exploiting multiple orthogonal radio channels. However, the design of routing and scheduling algorithms for such networks is challenging. According to the recent survey article by I. Akyiliz et al referenced earlier, 'These advanced wireless radio technologies all require a revolutionary design in higher-level protocols, especially MAC and routing protocols'.

Currently, there are no backhaul scheduling algorithms for WMNs which have low computational complexity, which can achieve throughputs as high as 100% and which can achieve near-minimal queuing delays, near-minimal delay jitter and near-perfect QoS for all provisioned backhaul traffic flows. A method to schedule multiple guaranteed-rate backhaul traffic flows in uniform single-channel or multi-channel WMNs with up to 100% throughout, with near-minimal delay and jitter and near-perfect QoS is required. A uniform WMN is one where there exists at most one radio edge between a pair of nodes.

Existing WMNs can also suffer from constrained backhaul traffic capacity due to the congestion caused by a small number of gateway BSs. The capacity of a WMN can be increased by adding more gateway BSs, or by adding more radio links to the network in congested areas resulting in a non-uniform WMN. A non-uniform WMN has redundant (extra) radio links between some pairs of nodes, which can be viewed as a single link with a non-uniform (higher) capacity than the other links. A method to schedule multiple guaranteed-rate backhaul traffic flows in non-uniform WMNs with up to 100% throughout, with near-minimal delay and jitter and with near-perfect QoS is required.

In a WMN the BSs typically exploit TDMA, where multiple BSs can access multiple orthogonal radio channels in the time domain. The time-axis consists of many physical time-slots, and a BS with a single radio transceiver can either transmit or receive during one time slot. Two types of conflicts have been identified in the literature. The paper by Min Cao incorporated earlier entitled "Multi-Hop Wireless Backhaul Networks: A Cross-Layer Design Paradigm" defines primary conflicts and secondary conflicts. A 'Primary' conflict occurs when one BS with one radio transceiver transmits and receives at the same time. To avoid primary conflicts, the scheduling method must ensure that the number of active radio edges incident to any BS in any time-slot does not exceed the number of radio transceivers available at that node, and that the active directed radio edges incident to each BS are assigned substantially orthogonal (non-conflicting) radio channels in every time-slot. A 'Secondary' conflict occurs when the signal power from remote nodes interferes with the signal power at the intended receiver. To mitigate secondary conflicts, the scheduling and channel assignment method must ensure that nearby activated edges do not interference excessively with the intended activated edge. Such schedulers and channel assignment algorithms typically define a conflict graph. Nodes may be represented as vertices, and nodes which may interfere with one another are joined by an edge. In a k-hop interference model, nodes within a distance of K from the primary transmission may interfere with the primary transmission. The following two papers establish that the problem of finding the optimal throughput under a general K-hop WMN interference model is NP-hard: The first paper is by K. Jain et al, entitled "Impact on Interference on Multi-Hop Wireless Networks Performance", ACM Mobicom 2003, which is hereby incorporated by reference. The second paper is by K. Jain et al, entitled "Impact of Interference on Multi-Hop Wireless Network Performance", Wireless Networks, 11, pp. 471-487, 2005, which is hereby incorporated by reference.

SUMMARY OF THE INVENTION

A schedule and channel assignment (SCA) method for use in a wireless mesh network (WMN) includes: forming a representation of a sequence of permutation matrices from an n×n rate matrix. The entries of the rate matrix define the bandwidth of links between the n nodes of the WMN. Each of the permutation matrices represents active radio links between the n nodes. The sequence of permutation matrices defines a sequence of radio links to provide the desired bandwidth of links between said n nodes. Further, a representation of a sequence of partial permutation matrices corresponding to the sequence of permutation matrices is formed in such a way that each of the permutation matrices can be decomposed into a group of partial permutation matrices. Each of the partial permutation matrices in a group represents non-interfering radio links between the n nodes. In each timeslot, the n nodes are configured for radio transmission and reception in accordance with at least one of the partial permutation matrices in each group to transmit traffic between the n nodes. Example SCA can be used to provision longer-term guaranteed-rate backhaul traffic flows supporting multimedia services such as VOIP or IPTV between base-stations in a WMN, with near-minimal delay and jitter and near-perfect Quality-of-Service for every provisioned traffic flow.

The method may be performed at a control processor of the network, or at individual nodes in the network. It may similarly be embodied in computer executable code stored on a computer readable medium for loading at a control processor, or within nodes of the network.

Other aspects and features of the present invention will become apparent to those of ordinary skill in the art upon review of the following description of specific embodiments of the invention in conjunction with the accompanying FIGS.

BRIEF DESCRIPTION OF THE DRAWINGS

In the figures which illustrate by way of example only, embodiments of the present invention.

FIG. 5A illustrates a conventional weighted bipartite graph. FIG. 5B illustrates a permutation in a bipartite graph. FIG. 5C illustrates edges in a unipartite graph. FIG. 5D illustrates a conventional N×N traffic rate matrix. FIG. 5E illustrates a permutation matrix. FIG. 5F illustrates a permutation vector.

FIG. 9A illustrates the method Schedule_Matrix_RFSMD. FIG. 9B illustrates the method Admissible. FIG. 9C illustrates the method Recursive_Schedule_Matrix. FIG. 9D illustrates a 4×4 matrix and the first 2 steps of its recursive partitioning. FIG. 9E illustrates the scheduling of a 4×4 matrix to yield 4 permutation matrices. FIG. 9F illustrates 16 permutation column vectors corresponding to scheduling of the 4×4 matrix in FIG. 9D.

FIG. 10 illustrates a greedy method Color_Permutation.

FIG. 11A illustrates a greedy method Color_2_Permutations. FIG. 11B illustrates a method color_augmenting_path. FIG. 11C illustrates a method find_uncolored_edge. FIG. 11D illustrates a method find_unused_color. FIG. 11E illustrates a method find_unused_color2. FIG. 11F illustrates a method find_unused_color3.

FIGS. 12, 13, 14 and 15 illustrates several examples of Wireless Mesh Networks, and their Link Traffic Rate Matrices.

FIG. 12 illustrates a single Wireless cell and two typical traffic rate matrices.

FIG. 13 illustrates two Wireless cells and two typical traffic rate matrices.

FIG. 14 illustrates four Wireless cells and several typical traffic rate matrices.

FIG. 15E illustrates a 32×32 sub-matrix of the 64×64 link traffic rate matrix for the 64-node WMN.

FIG. 16A illustrates a subset of the WMN of FIG. 1. FIG. 16B illustrates a subset of a link traffic rate matrix for the WMN of FIG. 1.

FIG. 17A illustrates a subset of a WMN with one extra dedicated directed radio link. FIG. 17B illustrates a subset of a WMN, with two extra directed radio links. FIG. 17C illustrates a link traffic rate matrix.

FIG. 18A illustrates a subset of a WMN with up to 6 extra radio links to be scheduled. FIG. 18B illustrates a link traffic rate matrix.

FIG. 19A illustrates a subset of a WMN with up to 24 extra directed radio links. FIG. 19B illustrates a link traffic rate matrix.

DETAILED DESCRIPTION

Figure 1:
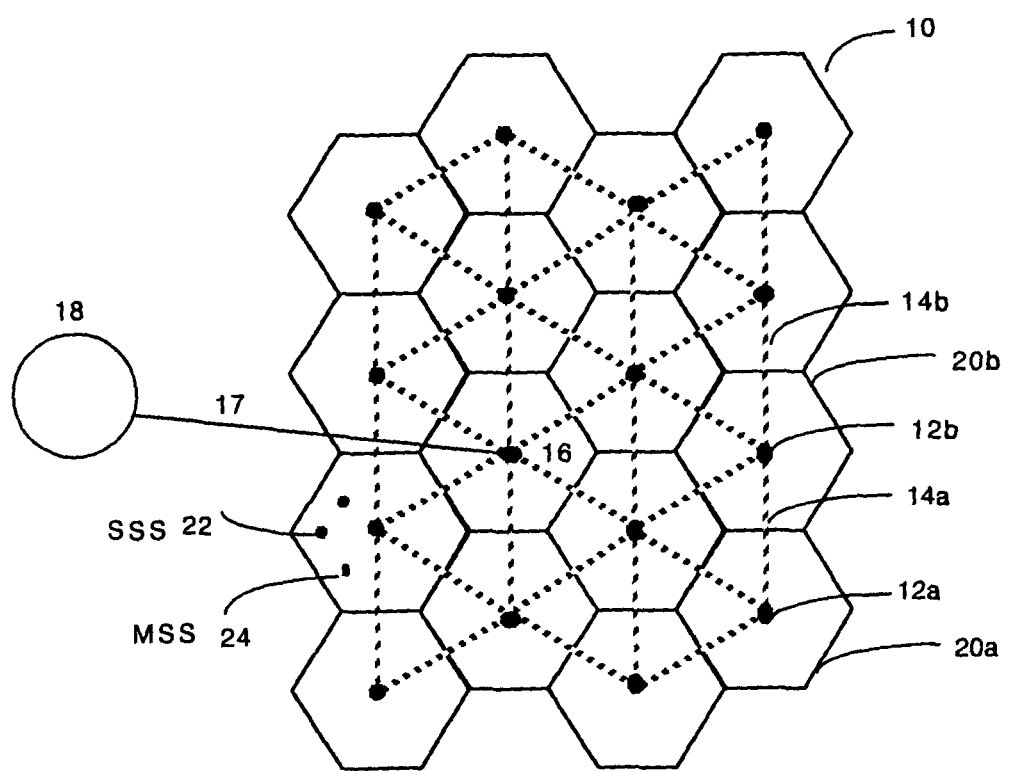
FIG. 1 illustrates a hexagonal wireless mesh network.

In overview, a scheduling-and-channel-assignment (SCA) method which supports conflict-free guaranteed-rate backhaul traffic flows in a WMN is disclosed. A set of backhaul traffic flows, each with a source, destination and guaranteed traffic rate, may be specified in a traffic demand matrix for the WMN. The traffic flows may be routed through the WMN, such that no edge or node constraints are violated. An Internet resource reservation protocol such as the Resource Reservation Protocol (RSVP), IntServ or DiffServ can be used to reserve resources (ie buffer space and bandwidth) along the wireless edges and the nodes in the WMN, according to the computed routes. The traffic rates on all radio edges in the WMN can then be computed in an admissible ink traffic rate matrix, according to the routing information. The link traffic rate matrix may then be decomposed into a sequence of permutations. Each permutation is colored to yield a group of one-colored transmission sets. Each one-colored transmission set is a partial permutation, which specifies the edges of the WMN which can be realized without conflicts using one color. The one-colored transmissions sets are assigned to time-slots in a TDMA scheduling frame for the WMN, which realizes the traffic demands specified in the traffic demand matrix.

A 'one-colored Transmission Set' represents a set of simultaneously active radio links in the WMN which are free of primary conflicts and which can be realized using 1 color. Each permutation is colored to yield a group of one or more one-colored transmission sets. The one-colored transmission sets are then assigned to the time-slots of the TDMA scheduling frame so that the WMN is free of primary conflicts given the available radio resources. In the resulting schedule for a TDMA scheduling frame, primary conflicts may be avoided, secondary conflicts can be mitigated, and backhaul traffic demands can be met with near-minimal delay and jitter and enhanced (e.g. near-perfect) Quality-of-Service for all provisioned backhaul traffic flows.

Conveniently, the SCA method may be used to compute transmission sets for each time-slot in a TDMA scheduling frame for a single-channel WMN, where each node has one radio transceiver for backhaul traffic. The transmission sets tend to increase the number of active BSs in each set, to increase the utilization of the WMN. Each BS is free of primary conflicts. Each BS may thus be either idle, transmitting or receiving in each time-slot, but it is never simultaneously transmitting and receiving.

The disclosed SCA method can similarly be used to compute transmission sets for each time-slot in a TDMA scheduling frame for a K-channel WMN, where each node has K radio transceivers for backhauling. These transmission sets tend to increase/maximize the number of active BSs in each set, to increase the utilization of the WMN. Each BS is free of primary conflicts. Each BS is never simultaneously active on greater than K channels in one time-slot, and all K'<=K radio channels used by any one node in one time-slot are substantially orthogonal.

An example disclosed SCA method can also be used to compute the transmission sets for each time-slot in a TDMA scheduling frame, for a single-channel WMN where each node has 1 radio transceiver for backhauling, which guarantee near-minimal delay and jitter and near-perfect Quality of Service (QoS) for every provisioned backhaul traffic flow.

An example disclosed SCA method further can also be used compute the transmission sets for each time-slot in a TDMA scheduling frame, for a K-channel WMN where each node has K radio transceivers for backhauling, which guarantee near-minimal delay and jitter and near-perfect Quality of Service (QoS) for every provisioned backhaul traffic flow.

An example disclosed SCA method can compute the transmission sets for each time-slot in a TDMA scheduling frame, for a K-channel WMN where each node has K radio transceivers for backhauling, which tend to minimize the number of queued cells per traffic flow per node. The amount of memory required for buffering packets in a wireless router is significantly reduced.

An example disclosed SCA method can compute permutations relatively quickly, in the order of seconds of computation time or less. The method can be performed in a Central Office which manages a WMN, or in a gateway node which manages the WMN.

An example disclosed SCA method can color the permutations to determine the 1-colored transmission sets relatively quickly, in the order of seconds of computation time or less. The method can be performed in a Central Office which manages a WMN, or in a gateway node which manages the WMN.

An example disclosed, the SCA method can be expressed in software and performed by a microprocessor. The method can also be expressed in hardware and implemented in a silicon integrated circuit, for example a Field Programmable Gate Array (FPGA) as manufactured by Altera Corp. USA (www.altera.com). The SCA algorithm can also be parallelized and executed on a multiple processors such as the 'multicore' processors available in current laptop computers.

An example disclosed, SCA method may also be used in a 'dynamic' manner, computing new permutations and transmission sets for every forthcoming TDMA scheduling frame. Traffic is dynamically scheduled as needed for each scheduling frame.

An example SCA method can also be used to a reserve an appropriate amount of excess bandwidth for every link. This may be useful when certain links have a predictable probability of error, due to a low Signal to Interference and Noise Ratio (SINR). The expected number of unsuccessful packet transmissions can, for example, be computed for every edge, and the appropriate amount of excess bandwidth can be scheduled on every edge to compensate.

FIG. 1 illustrates a hexagonal wireless mesh network 10 with sixteen wireless nodes 12. Each node 12 is a wireless node called a Base-Station (BS), which can communicate with neighboring nodes over radio links 14. In FIG. 1, one node is a Gateway Base-Station 16. This gateway BS has a direct wired connection 17 to the global Internet Protocol (IP) network 18. Each node 12 also manages 'end-user' radio communications to/from end-users within an area called a 'wireless cell' 20.

Each node 12 has one or more radio transceivers which can be used to establish a radio edge 14 for communications. A node may communicate with the Stationary Subscriber Stations (SSSs) 22 or the Mobile Subscriber Stations (MSSs) 24 within the wireless cell 20. A node may also communicate with neighboring nodes 12.

The WMN can employ an Adaptive Modulation and Coding (AMC) scheme. The AMC schemes specify the modulation technology (ie BPSK or QAM), the transmission power level, and the level of Forward-Error-Correction (FEC) coding required to achieve a specified data-rate, a specified Signal-to-Interference plus Noise Ratio (SINR), and a specified Bit-Error-Rate (BER) over each radio link 14. In the proposed WMN system, the physical link parameters are computed to provide each radio link 14 between neighboring BSs with a fixed data-rate, for example 128 Mbps and a low BER. A similar scheme was proposed in the paper by M. Cao et al entitled "Multi-Hop Wireless Backhaul Networks: A Cross-Layer Design Paradigm", which was incorporated earlier. This paper describes an algorithm to compute the MIMO antenna beamforming weights and the transmission powers for every active radio link in a WMN, while providing each active radio link with a fixed data rate and a sufficiently low BER. Adaptive modulation and coding is also described in a paper by G. Caire and K. R. Kumar, 'Information Theoretic Foundations of Adaptive Coded Modulation', Proceedings of the IEEE, vol. 95, No. 12, 2007, pp. 2274-2298, which is hereby incorporated by reference.

Figure 2A:
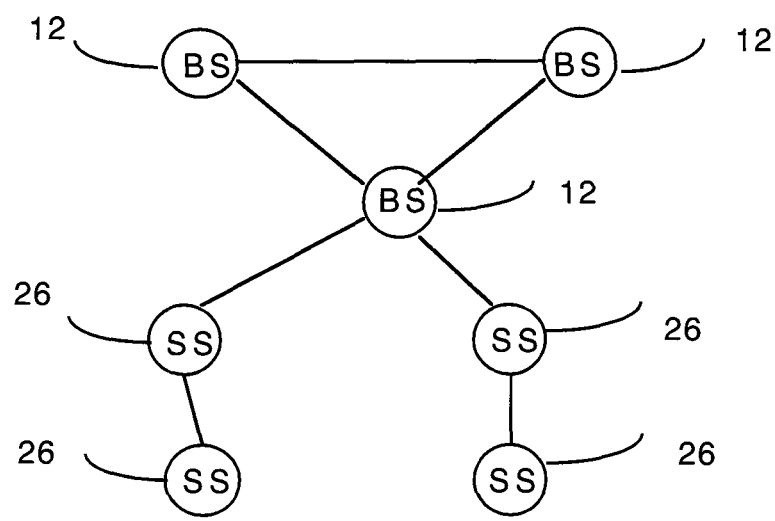
FIG. 2A illustrates the various types of communications in a WMN.

FIG. 2A illustrates several types of traffic in a WMN. A WMN may support End-User traffic between the nodes 12 and the SSSs 22 or MSSs 24. In FIG. 2A, we do not distinguish between the SSSs 22 and MSSs 24, and both are represented by Subscriber Station (SS) nodes 26. Backhaul traffic between neighboring nodes 12 is also denoted (BS,BS) traffic in this document. End-user traffic between a node 12 and an end-user node 26 is also denoted as (BS,SS) traffic. Direct communications between the SSs 26 will be denoted (SS,SS) traffic.

Figure 2B:
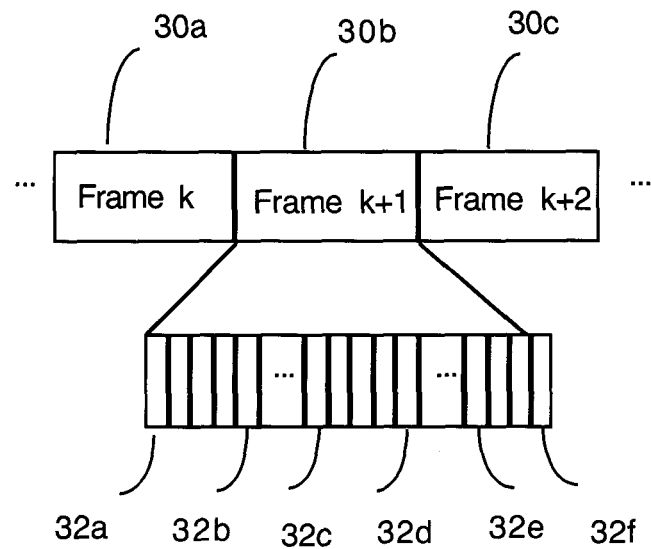
FIG. 2B illustrates a typical TDMA scheduling frame with F time-slots.

FIG. 2B illustrates a typical TDMA scheduling frame 30, consisting of F time-slots 32. In some systems, the F time-slots may be divided into downlink time-slots, uplink time-slots, and backhaul time-slots. For example, time-slots 32a-32b may be used for downlink transmissions from the BS node to the SSs. Time-slots 32c-32d may be used for uplink transmissions from the SSs to the BS. Time-slots 32e-32f may be used for transmissions of backhaul traffic between BSs 12. In other systems, each time-slot may be used for either uplink, downlink or backhaul traffic.

In multi-channel WMNs where each node has multiple radio transceivers, in each time-slot 32 a node be transmitting and receiving simultaneously over multiple orthogonal radio channels. There is a small 'guard interval' preceding every time-slot, which is not shown in FIG. 2B. In the guard interval just before each time-slot 32, the radio transceivers must be able to rapidly change their state rapidly from transmitting to receiving, and they must be able to select and operate on the appropriate orthogonal radio channel.

Figure 3A:
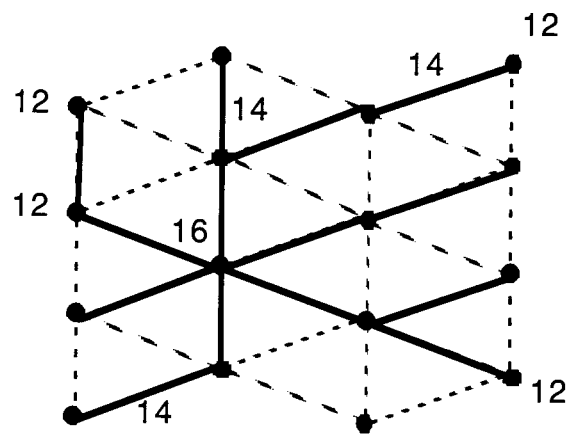
FIG. 3A illustrates a graph model of a WMN with an embedded communication tree topology.

FIG. 3A shows a communication tree topology with active radio edges 14, with a root at the GS 16 which leads to every BS 12. This tree topology can be used to define an 'upward' communication tree and a 'downward' communication tree. A 'downward tree' will carry backhaul traffic from GS 16 to all BSs 12. All backhaul traffic from the global IP network 18 will arrive at the GS 16 and will travel along the downward tree to the destination BSs 12. The active directed radio edges 14 will transmit in the directions leading away from GS 16. The same tree topology in FIG. 3A can be used to define an 'upward' communication tree. This 'upward tree' will carry backhaul traffic from all BSs 12 to the GS 16. In the upward tree, the active directed radio edges 14 transmit in the directions leading toward the GS 16.

Figure 3B:
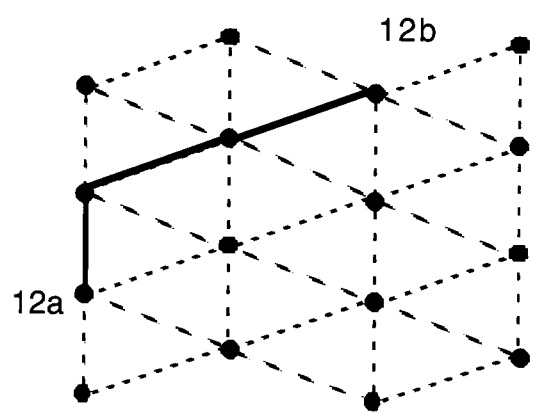
FIG. 3B illustrates a graph model of a WMN with a point-to-point topology.

FIG. 3B illustrates a 'local' backhaul traffic flow topology with active radio edges 14 between two nodes 12a and 12b in a WMN, which does not go to the global IP network 18. Such a local backhaul traffic flow may consist of VOIP traffic between a pair of nodes 12a and 12b within a WMN. This local traffic does not require access to the global Internet network 18 and need not pass through the GS node 16. The traffic may flow in two directions. Traffic from node 12a to node 12b will typically require three active directed radio edges 14 which transmit in the direction from node 12a to node 12b. Traffic from node 12b to node 12a will require three active directed radio edges 14 which transmit in the direction from node 12b to node 12a.

The traffic demands of all backhaul traffic can conveniently be specified in a N×N Traffic Demand Matrix D for any WMN. The traffic demand matrix D consists of elements D(j,k), where each element D(j,k) specifies the guaranteed traffic rate demanded for a backhaul traffic flow T(j,k) from source node j to destination node k. The traffic demand matrix for a WMN does not specify routing information. The traffic flow rates specified in the traffic demand matrix D must be routed through the WMN along specific paths as illustrated in FIGS. 3A and 3B.

Figure 3C:
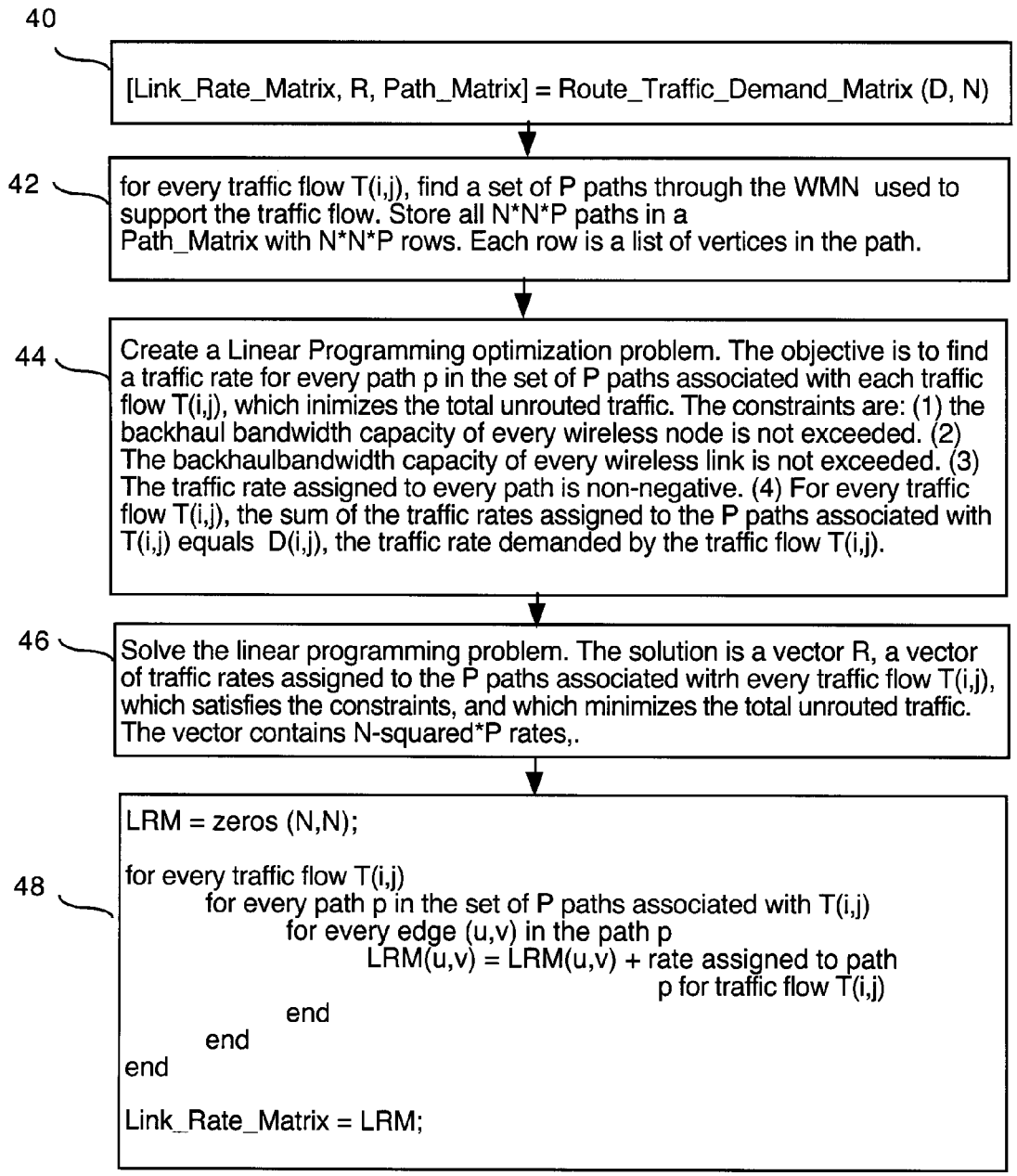
FIG. 3C illustrates a flow chart for routing a traffic demand matrix in a WMN and for recovering a link traffic rate matrix.

A typical routing problem formulation for general networks is described in a textbook by D. Bertsekas and R. Gallager, entitled 'Data Networks', Prentice-Hall, 1999, which is hereby incorporated by reference. Chapter 5 describes the routing problem in general networks. FIG. 3C illustrates a flow-chart for the general routing method called Route_Traffic_Demand_Matrix. In box 40, the method accepts an N×N traffic Demand matrix D, and the number of nodes N in the WMN. In a typical routing problem formulation, the guaranteed traffic rate D(j,k) demanded by traffic flow T(j,k) can be distributed over multiple paths through the WMN. In box 42, a set of P paths is selected for every traffic flow T(j,k), from the set of all paths through the WMN between nodes j and k. For example, these P paths may be the first P shortest paths between nodes j and k. (The same path may also be included in the set of P paths repeatedly.) All the selected paths can be stored in a matrix called the Path_Matrix, where each row represents a path, and where each path is a sequence of nodes in the WMN. The Path_Matrix requires (N*N*P) rows. Algorithms to find shortest paths are described in the textbook 'Data Networks' referenced earlier. In box 44, a Linear Programming optimization problem is formulated. Given the set of P paths selected for every traffic flow, an optimization problem can be formulated. A typical optimization problem may have an objective function to assign a traffic rate to every path associated with every traffic flow, which will minimize the total amount of unrouted traffic. There are several constraints to be satisfied. Four typical constraints are as follows: (1) The total traffic entering and exiting a wireless node 12 on any incident radio edges 14 cannot exceed the bandwidth capacity of the node. (2) The total traffic traversing a directed wireless link 14 cannot exceed the capacity of the directed link. (3) The traffic rate assigned to each path is non-negative. (4) The sum of traffic rates assigned to the set of P paths associated with a traffic flow T(j,k) equals the requested rate D(j,k) specified in the traffic demand matrix D. The optimization problem can be solved using Linear Programming. Linear Programming is described in the Matlab documentation. Linear Programming is described in a document available from The Mathworks Inc., entitled 'Linear Programming', available at http:///www.mathworks.com, which is hereby incorporated by reference.

In box 46, the optimization problem may be solved. The solution is a vector R of rates assigned to the N*N*P paths in the routing problem, which satisfies the constraints specified in box 44. In box 48, a Link Traffic Rate Matrix LRM is computed. The matrix element LRM(j,k) specifies the traffic rate carried on a directed radio edge 14 between nodes j and k in the WMN, as determined by the optimization problem which was solved in box 46. The traffic rate can be expressed as a number of time-slot reservations in a TDMA scheduling frame of length F time-slots.

Figure 4A:
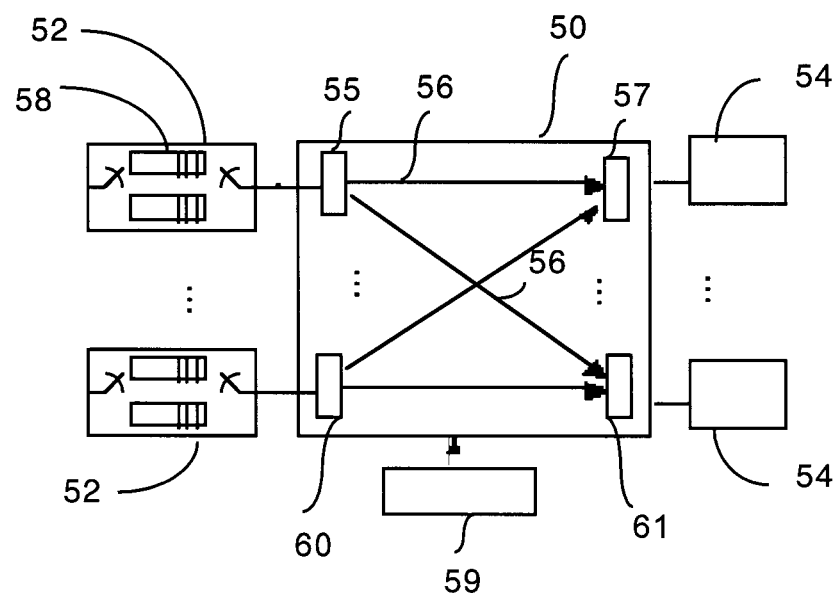
FIG. 4A illustrates an Input-Queued (IQ) switch architecture.

FIG. 4A illustrates a conventional N×N Input-Queued (IQ) switch 50. The switch has N input ports 52 and N output ports 54, and N-squared wires 56 between every input and every output port. The input ports 52 and the output ports 54 can be identified with indices from 0 to N−1, starting from the top and moving downward in FIG. 4A. Every input port 52 with index j has N Virtual-Output-Queues (VOQs) 58, which can be denoted as the VOQs with indices (j,1) . . . (j,N). Each VOQ 58 with indices (j,k) stores the packets at input port j which are destined for output port k. Each output port 54 is associated with 1 VOQ 58 at each input port 52. Equivalently, each output port 54 is associated with N VOQs 58 at the input side for which it is the destination. The IQ switch 50 has N demultiplexer blocks 55. Each demultiplexer block 55 may receive 1 cell from an associated input port and forward the 1 cell to the appropriate output port 54 over a wire 56. The switch also has N multiplexer blocks 57. Each multiplexer block 57 may receive up to N cells from N wires 56 from all N input ports 52 and forwards at most 1 cell to the associated output port 54.

There are 2 sets of constraints in an IQ switch, called the Input Constraints and the Output Constraints. The Input Constraints require that from the set of N VOQs 58 associated with each input port 52 with index j, only 1 VOQ can be active per time-slot, so that each input port 52 with index j transmits at most 1 cell per time-slot. A cell is a fixed-sized packet. The input constraints will remove the potential conflicts at the input side of the IQ switch 50 in FIG. 4A. The Output Constraints require that from the set of N VOQs 58 associated with each output port 54 with index j, only 1 VOQ can be active per time-slot, such that each output port receives at most 1 cell per time-slot. The output constraints removes the potential conflicts at the output side of the IQ switch 50 in FIG. 4A. In each time-slot, both input conflicts and output constraints must be satisfied, making the scheduling for an IQ switch 50 a difficult problem. A scheduler 59 is used to identify cells which can be moved from the input ports to the output ports per time-slot. A set of cells which can move through an IQ switch in one time-slot without conflict is called a permutation. A permutation can be represented as a set of N or fewer edges in a bipartite graph, as will be established in FIG. 5 ahead.

Figure 4B:
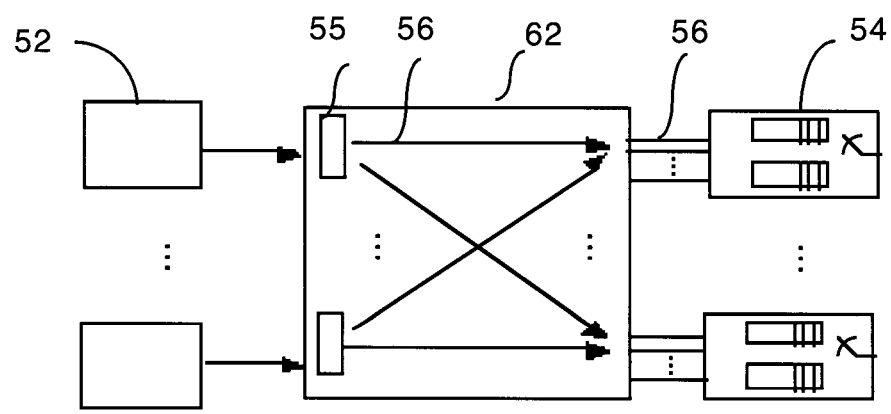
FIG. 4B illustrates an Output-Queued (OQ) switch architecture.

FIG. 4B illustrates a conventional Output-Queued (OQ) switch 62. The OQ switch 62 has N input ports 52 and N output ports 54, and N-squared wires 56 between every input port and every output port. The OQ switch has an internal output speedup of N, so that there are no conflicts at the output side. The output speedup can be implemented by allowing N wires 56 to reach each output port 54. To avoid input conflicts, in each time-slot every input port 54 sends at most one cell to an output port 54, through its demultiplexer block 55. Due to the output speedup, an output port 54 can accept up to N cells simultaneously. Therefore, up to N cells arriving in one time-slot at the OQ switch 62 can move through the switch in parallel and be stored at any output queue 54 without conflict. The output speedup removes the need to perform any complex scheduling in an OQ switch 62. In every time-slot, every input port 52 simply forwards a packet it may receive to the desired output port 54 over a wire 56 without conflict. OQ switches are an idealization. Small OQ switches can be implemented, but large OQ switches or OQ switches with high data rates are not feasible, due to the cost of implementing the output speedup. An output speedup is typically implemented by having N wires 56 between the switch 62 and the output ports 54, to carry the multiple packets to each output port, and by running the queueing memory (not shown) in each output port 54 N times faster than the rate at which queueing memory 58 operates at the input ports 52. Memory rates however are typically limited, thereby limiting the amount of output speedup which can be realized.

In practice, large switches are implemented by several methods: (1) IQ switches which use a scheduling algorithm to resolve conflicts; (2) Switches which utilize Combined Input Queuing and Output Queuing (denoted as CIOQ switches) with a lower output speedup (typically 2 or 4) and with scheduling algorithms; (3) Switches which utilize Combined Input Queuing and Crosspoint Queuing (denoted as CIXQ switches) with scheduling algorithms. CIOQ switches are described in a paper by B. Prabhakar and N. Mckeown, entitled 'On the Speedup Required for Combined Input and Output Queued Switching' (1997), Technical Report CSL-TR-97-738, Stanford University, which is hereby incorporated by reference.

FIG. 5A illustrates a weighted bipartite graph 70. A bipartite graph 70 has all nodes belonging to one of two distinct and non-overlapping sets. The graph in FIG. 5A has four nodes 72 on the left side, four nodes 74 on the right side, and up to sixteen directed edges 76 from the nodes 72 to the nodes 74. A bipartite graph can be used to represent the traffic rates demanded in an N×N IQ switch. Each node on the left side represents an input port 52 of the IQ switch. Each node 74 on the right side represents an output port 54 of the IQ switch. Each directed edge 76 may have an associated weight. The weight may represent the traffic rate demanded between the pair of nodes that the edge joins. Equivalently, the weight on an edge 76 may represent the number of time slot reservations requested between an input port 52 and an output port 54 in an IQ switch 50, in a TDMA scheduling frame with F time-slots.

FIG. 5B illustrates a full permutation represented as a bipartite graph. A full permutation in a bipartite graph with N nodes on each side is defined as a set of exactly N edges 76, where each node 72 on the left side is connected by an edge 76 to exactly one node 74 in the right side, and where each node 74 on the right side is connected by an edge 76 to exactly one node 72 on the left side. A partial permutation represented in a bipartite graph with N nodes on each side is defined as a set of N'<=N edges 76, where each node 72 on the left side may be connected by an edge to at most one node 74 on the right side, and where each node 74 on the right side may be connected by an edge 76 to at most one node 72 in the left side. In a partial permutation, some nodes 72 and 74 may be unconnected by an edge 76.

A partial or full permutation in a bipartite graph may represent the connections to be realized in one time-slot in an IQ switch 50. In each time-slot in an IQ switch 50, each input port 52 may be connected to at most one output port 54, and each output port 54 may be connected to one at most one input port 52. The connections in an IQ switch 50 can form the edges 76 of a bipartite graph. These edges 76 which form a permutation in a bipartite graph obey the set of Input Constraints and Output Constraints in an IQ switch 50.

FIG. 5C illustrates a unipartite graph. A unipartite graph is a regular or conventional graph, where the nodes are not divided into 2 distinct and non-overlapping sets. A unipartite graph can be obtained from a bipartite graph. Each node 73a in the unipartite graph is obtained by merging node 72a and 74a in the bipartite graph. A similar merge operation is performed on the other nodes. An edge 76 in the bipartite graph between nodes 72a and 74b becomes an edge 73 in the unipartite graph between nodes 73a and 73b. A similar operation is used to determine the other edges in the unipartite graph. A unipartite graph can be used to represent the active radio edges corresponding to a permutation in a WMN. The network in FIG. 7 is also a unipartite graph, ie a conventional graph. A permutation can also be represented as a regular graph with directed edges, where each node is the source of at most one edge, and the destination of at most one edge.

FIG. 5D illustrates a 4×4 traffic rate matrix 78a. The traffic rate matrix can be used to represent the traffic rates demanded in an IQ switch 50. Each row with index j of the matrix 78a represents an input port 52 with index j. Each column of the matrix 78a with index k represents an output port 54 with index k. Each matrix element R(j,k) in row j and column k may represent the traffic rate demanded between input port 52 with index j, and output port 54 with index k, in an IQ switch 50.

FIG. 5E illustrates a 4×4 permutation matrix 78b. A full permutation matrix is a matrix where the sum of every row is exactly 1, and where the sum of every column is exactly one, and where every element is either a 0 or 1. A partial permutation matrix is a matrix where the sum of every row is at most 1, and where the sum of every column is at most one, and where every element is either a 0 or 1. A full or partial permutation matrix can represent a full or partial permutation of N elements in a bipartite graph. Each '1' in the permutation matrix in row u and column v specifies a directed edge between a pair of nodes (u,v). A permutation matrix satisfies the set of Input Constraints and Output Constraints for an IQ switch 50, and therefore a permutation matrix 78b can represent the connections which can be made in a IQ switch 50 in one time-slot without conflicts. The permutation matrix in FIG. 5E represents the permutation in the bipartite graph in FIG. 5B. Hereafter, the phrase 'permutation matrix' will refer to a partial or full permutation matrix.

FIG. 5F illustrates a permutation vector V of N=4 elements. A permutation vector can represent a permutation matrix. A permutation vector can also represent the connections to be realized in one time-slot in an IQ switch 50. Vector element V(j)=k indicates that a '1' exists in row j and column k of the permutation matrix it represents. If row j of the permutation matrix contains no '1', then V(j)=−1. In other words, vector element V(j)=k indicates that input port 52 with index j is connected to output port 54 with index k, for 0<=j<N and for 0<=k<N. Equivalently, vector element V(j)=k indicates that a directed edge exists from node j to node k in a graph representation. Vector element V(j)=−1 indicates that input port 52 with index j is not connected to any output port 54. The permutation vector in FIG. 5F represents the same connections to be realised in an IQ switch as the permutation matrix in FIG. 5E, which represents the same connections to be realised as the permutation in the bipartite graph in FIG. 5B. A 'full permutation vector' is a permutation vector that corresponds to a full permutation matrix. A 'partial permutation vector' is a permutation vector that corresponds to a partial permutation matrix. Hereafter, the phrase 'permutation vector' will refer to a partial or full permutation vector, unless a distinction between the two is necessary. A permutation vector with N elements may be represented as a row vector, with one row of N elements. A permutation vector with N elements may also be represented as a column vector, with one column of N elements.

Conveniently, a permutation vector with N elements requires significantly less memory when stored in a computer, compared to a permutation matrix with N-squared elements. Hence, in many applications permutation matrices may be stored and manipulated as permutation vectors. To further reduce the memory requirements, a permutation matrix or a permutation vector may be represented as a set or a list of active edges, where each edge from node u to node v is stored as a tuple (u,v). A tuple is defined mathematically as an ordered set of elements, and a directed edge can therefore be represented as a tuple of 2 elements. The use of sets or lists allows for further memory savings, since only the active edges need to be stored. A permutation matrix with no edges will correspond to an empty set or empty list. A permutation matrix with K edges will correspond to a set or list with k pairs of numbers.

As will be appreciated by those of ordinary skill, the mathematical constructs used herein may be represented in any number of ways. For example, permutation matrices and partial permutation matrices may be represented as permutation vectors, bipartite graphs, graphs, sets or lists of interrelated elements, sets or lists of tuples, or in other ways understood by those of ordinary skill. Each representation may present some computational advantage or disadvantage over another representation, but is equivalent for the purposes of scheduling traffic as described herein. We will use the phrase 'permutation set' hereafter to denote the concept of a permutation of N elements where it is understood that a permutation set represents a permutation matrix, and where it is understood that the permutation set can be implemented as a permutation matrix, a permutation vector, a bipartite graph, a graph, a set of tuples, or a list of tuples, or some other representation.

An admissible traffic rate matrix 78 for an IQ switch 50 requires that no input port 52 and no output port 54 are overloaded. Therefore, the number of time-slots reservations for traffic leaving any input port 52 in a TDMA scheduling frame cannot exceed F, where F=the number of time-slots in a TDMA scheduling frame. Similarly, the number of time-slots reservations for traffic arriving at any output port 54 cannot exceed F. An admissible traffic rate matrix for an IQ switch 50 given a TDMA scheduling frame length F is a matrix where the sum of every row is <=F, and where the sum of every column is <=F, and where every element is non-negative. An admissible matrix is also called a doubly substochastic or doubly stochastic traffic rate matrix in this document.

Figure 6A:
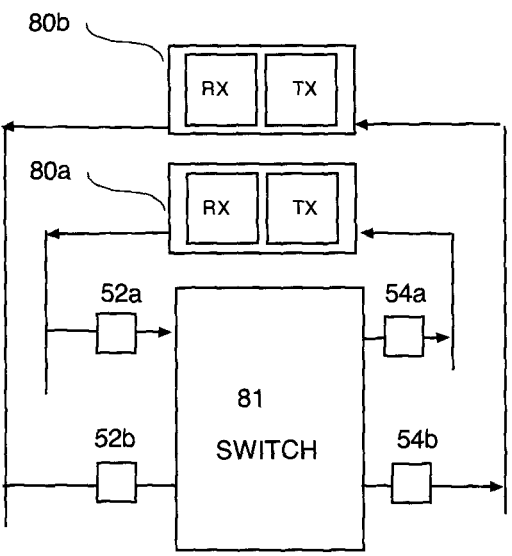
FIG. 6A illustrates a basic Base-Station node with 2 radio transceivers.

FIG. 6A illustrates the design of a typical Base-Station node 12. The node 12 has two radio transceivers 80a and 80b. In one design, one radio transceiver 80a can be used for backhaul traffic, and one radio transceiver 80b can be used for end-user traffic. The node 12 has a switch 81 with input ports 52a and 52b and output ports 54a and 54b. Each radio transceiver 80 is connected to one input port 52 and one output port 54. A cell is defined as a fixed-sized packet, typically carrying 1,024 bits of data. An incoming cell of backhaul traffic may be received by node 12 over its radio transceiver 80a, and is delivered to an input port 52a. The cell will be transferred from the input port 52 to an output port 54 over the switch 81. The cell may be transmitted from an output port 54 over the radio transceiver 80 to a neighboring node 12. In a low-cost application, a node 12 may have just one radio transceiver 80, which is used for both backhaul traffic and end-user traffic.

The switch 81 in FIG. 6A may be an OQ switch in an idealized description. However, high-capacity OQ switches are difficult to realize and in practice the switch may have one of three designs; (1) An IQ switch with a scheduling algorithm to resolve IO conflicts, (2) a Combined-Input-and-Output-Queuing (CIOC) switch with limited speedup and a scheduling algorithm to resolve conflicts, or (3) a Combined-Input-and-Crosspoint-Queuing (CIXQ) switch with scheduling algorithms. CIXQ switches are described in a paper by N. Chrysos and M. Katevenis entitled 'Weighted Fairness in Buffered Crossbar Scheduling', IEEE HPSR Conference, 2003, Torino Italy, pp. 17-22, which is hereby incorporated by reference.

Figure 6B:
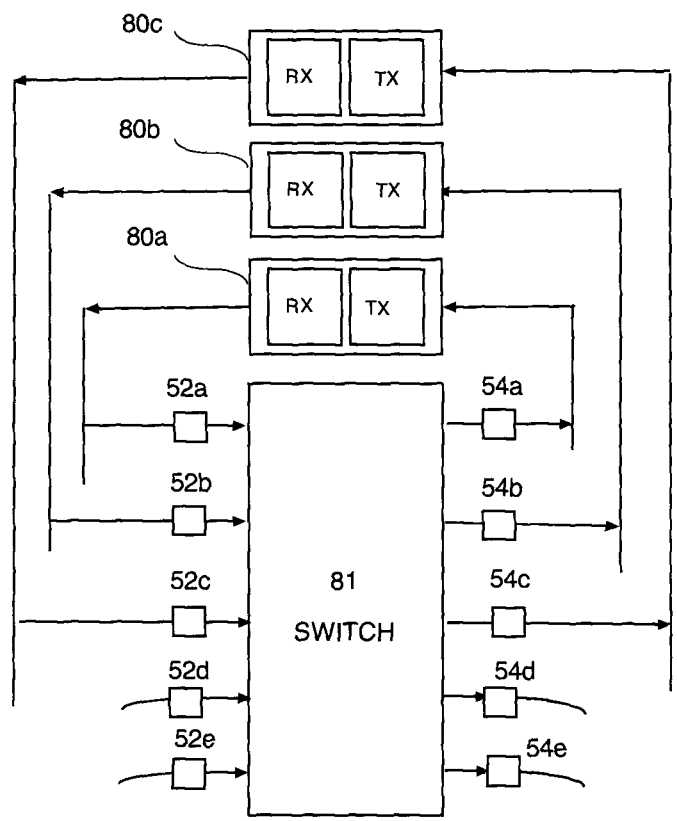
FIG. 6B illustrates a Gateway Base-Station node with 3 transceivers.

FIG. 6B illustrates the design of a typical Gateway BS 16, with 3 radio transceivers 80. In one design, 2 transceivers 80a and 80b may be used for backhaul traffic, and one radio transceiver 80c may be used for end-user traffic. The switch 81 has a total of 5 input ports 52 and 5 output ports 54. Three input ports 52a, 52b and 52c are connected to the 3 radio transceivers 80a, 80b and 80c. Three output ports 54a, 54b and 54c are connected to the 3 radio transceivers 80a, 80b and 80c. The switch 81 also has 2 input ports 52d and 52e, and 2 output ports 54d and 54e, which carry traffic arriving to and from the global Internet network 18.

In FIG. 6B, the node 16 may operate in one of several modes in each time-slot. The 2 radio transceivers 80 for backhaul traffic can operate in the following modes, where each mode denotes the states of the two backhaul transceivers: (Idle,Idle), (TX,Idle), (RX, Idle), (TX,RX), (TX,TX), and the (RX,RX) mode. The scheduling algorithm will determine the states of the node 16 when backhaul traffic is scheduled through the node. In the last 3 modes, both radio transceivers 80 are active in each time-slot. In the (TX,RX) mode, a node 16 may simultaneously transmit and receive over two transceivers 80 in one time-slot. In the (RX,RX) mode, a node may simultaneously receive on two transceivers in one time-slot. In the (TX,TX) mode, a node may simultaneously transmit on two transceivers in one time-slot.

Scheduling for Input-Queued (IQ) Switches

The problems of routing and scheduling in a large class of systems called 'constrained queueing systems' where first considered in a paper by L. Tassiulas and A. Ephremides, "Stability Properties of Constrained Queueing Systems and Scheduling Policies for Maximum Throughput in Multihop Radio Networks", IEEE Trans. Automatic Control, Vol. 37, No. 12, pp. 1936-1948, 1992, which is hereby incorporated by reference. The authors defined a graph model G(V,E) for a large class of queueing systems. The vertices V of the model represent queues. The edges E represent the servers. The servers are interdependent, in that they cannot provide service simultaneously. An 'activation set' is a set of servers which can be simultaneously activated. A 'constraint set' consists of all allowable activation sets in the system. The network designer therefore has the freedom to define allowable sets of active servers.

The class of constrained queueing systems is broad and includes multihop wireless networks, data base systems, input queued switches and certain parallel processing systems. The paper established that a scheduling algorithm which computes a Maximum Weight Matching (MWM) of a bipartite graph in each time-slot can achieve bounded queue sizes and maximum throughput in a large class of constrained queueing systems. While the result is theoretically significant, the MWM algorithm has a complexity of $O(N^3)$ operations per time-slot, which renders the algorithm intractable for use in practice. Linear complexity algorithms which can achieve maximum throughput in two types of constrained queueing systems, radio networks and input queued switches, where proposed by L. Tassiulas in the paper entitled "Linear Complexity algorithms for maximum throughput in radio networks and input queued switches", IEEE, 1998, which is hereby incorporated by reference. While these algorithms can achieve maximum throughput, the queue sizes can be large at high loads, ie potentially hundreds of packets may be waiting in each queue. Furthermore, there is no explicit consideration of Quality-of-Service in these algorithms.

Recently, an algorithm for scheduling traffic through an IQ switch with up to 100% throughput while simultaneously meeting QoS guarantees has been proposed, in a US patent application by T. H. Szymanski, entitled "Method and Apparatus to Schedule Packets Through a Crossbar Switch with Delay Guarantees", filed May 29, 2007, application Ser. No.

11/802,937 which is hereby incorporated by reference. The method processes a traffic demand matrix for an IQ switch 50, and computes a schedule for an IQ switch for a TDMA scheduling frame with F time-slots. The schedule consists of F permutation matrices or permutation vectors. The schedule guarantees that every traffic flow T(j,k) receives its requested traffic rate D(j,k) specified in the traffic demand matrix. Furthermore, the service received by every traffic flow is guaranteed to have near-minimal delay and jitter and therefore near-perfect QoS. The method is also described in a paper by T. H. Szymanski entitled "A Low-Jitter Guaranteed-Rate Scheduling Algorithm for Packet-Switched IP Routers", to appear in the IEEE Transactions on Communications, November 2009, which is hereby incorporated by reference. This method will be summarized with reference to FIG. 9.

FIG. 7: Transformation, Scheduling in WMNs to Scheduling in IQ Switches

We now describe a transformation between the problem of scheduling backhaul traffic flows in a simplified WMN model and the problem of scheduling traffic flows in an IQ switch. This transformation has never been recognized before in the literature. The study of scheduling algorithms for IQ switches has existed for at several decades. A brief summary is provided in the paper by T. H. Szymanski entitled "A Low-Jitter Guaranteed-Rate Scheduling Algorithm for Packet-Switched IP Routers", which has been incorporated earlier. The study of scheduling algorithms for WMNs has also existed for several decades. To date a transformation between the two scheduling problems has not been noted or exploited. By creating a transformation between the problem of scheduling traffic flows in an IQ switch and the problem of scheduling backhaul traffic flows in a simplified WMN model, it is established in this patent application that schedules which can guarantee near-minimal delay and jitter and near-perfect QoS for backhaul traffic flows in a WMN can be computed, given reasonable assumptions for the infrastructure WMN.

There are two difficulties in establishing a transformation between a WMN and an IQ switch. The first difficulty deals with the different sizes of the two networks. The scheduling algorithm for IQ switches described in the U.S. patent application Ser. No. 11/802,937 by T. H. Szymanski works efficiently for IQ switches which have sizes which are powers of 2, for example 8×8 switches, 16×16 switches, or 64×64 switches. In practice, a WMN may have an arbitrary number of nodes, for example 7 nodes, 23 nodes or 37 nodes. There is a problem in establishing a relationship between a WMN with an arbitrary number of nodes H which is not a power of 2, and an IQ switch with a size N which is a power of 2. These two systems do not even have the same number of nodes. In the following discussion it is established that a relationship can be developed, even when the WMN has far fewer nodes that the IQ switch.

The second difficulty deals with the nature of the wireless edges. It is known that scheduling in an IQ switch 50 corresponds to finding a matching or permutation in a bipartite graph as shown in FIG. 5B. An IQ switch has N-squared directed edges, from input ports to output ports. A permutation allows input port j to transmit and output port j to receive, simultaneously in one time-slot. However, in a WMN each node 12 has one or more radio transceivers 80. Each radio transceiver 80 may function as a transmitter or a receiver at any one time-slot. In a node with a single radio transceiver for backhauling, a wireless edge can be transmitting or receiving in one time-slot, but it cannot do both simultaneously. Therefore, the permutations computed for an IQ switch cannot be used directly, and must be processed and adapted for use in a WMN. The processing involves computing conflict-free transmission sets, assigning colors (radio resources) to transmissions sets, and assigning transmission sets to time-slots, as will be established in this document. It will be shown that a transmission schedule for an IQ switch for a TDMA scheduling frame with F time-slots, can be transformed into a transmission schedule for a WMN for a TDMA scheduling frame with G time-slots, where G may be less than F, where G may equal F, or where G may be greater than F. In other words, the length of a transmission schedule for a WMN does not necessarily equal the length of a transmission schedule for an IQ switch.

Referring to FIG. 4A, an N×N IQ switch 50 has N input ports 52 and N output ports 54. Recall that there are 2 sets of constraints in an IQ switch. The Input Constraints require that from the set of N VOQs 58 at each input port 52, only 1 VOQ can be active per time-slot so that each input port 52 transmits at most 1 cell per time-slot. The input constraints removes the potential conflicts at the input side of the IQ switch 50 in FIG. 4A. The Output Constraints require that from each set of N VOQs 58 associated with each output port 54, only 1 VOQ can be active per time-slot so that each output port receives at most 1 cell per time-slot. The output constraints removes the output conflicts at the output side of the IQ switch 50 in FIG. 4A.

Figure 7A:
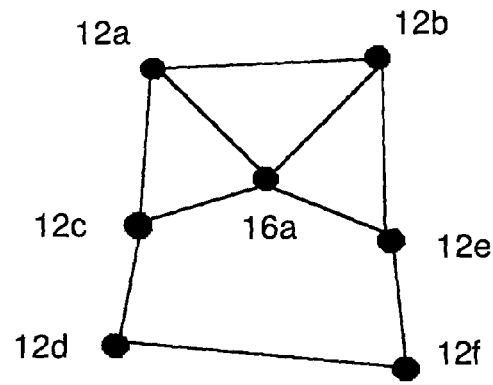
FIG. 7A illustrates a 7-node WMN.

Consider the 7-node WMN shown in FIG. 7A. Each node 12 in FIG. 7A is a wireless node as shown in FIG. 6A, with 3 radio transceivers 80. The wireless node shown in FIG. 6A contains a switch 81 which may be an IQ switch 50, an OQ switch 62 if the router is sufficiently small, or some other switch design such as a CIOQ switch. Due to the difficulty of constructing high-capacity OQ switches, let the switches in the nodes 12 of the WMN be CIOQ switches. Referring to FIG. 6A, backhaul packets are received on a radio transceiver 80 and buffered at an input port 52 when they arrive at the node 12. The packets are then scheduled for transmission through the switch 81 to an output port 54 at some future time-slot. They are scheduled for transmission from the output port 54 over the radio transceiver 80 to another node at another future time-slot. The output ports 54 contains output queues (not shown) which are necessary since a packet arriving at an output port 54 in one time-slot may not be scheduled for departure in the same time-slot, as the necessary radio link 14 may not be activated at that time-slot. Assume that each wireless node 12 will allocate K radio transceivers 80 for back-haul traffic, and one radio transceiver 80 for end-user traffic. Each wireless node 12 with K radio transceivers for backhaul traffic and one radio transceiver for end-user traffic will require a CIOQ switch with (K+1) input ports 52 and (K+1) output ports 54, with (K+1)-squared VOQs 58 at the input side and (K+1) output queues (not shown) at the output side.

Referring to FIG. 7A, the WMN has 6 BS nodes labelled 12a-12f and one GS node 16a. Let the 6 nodes 12a, 12b, 12c, 12d, 12e and 12f each have 2 radio transceivers for backhaul traffic, and one radio transceiver for end-user traffic. These 6 nodes will have CIOQ switches of size 3×3. Each switch will have with 9 VOQs and 3 OQs. Let node 16a be a GS, with 2 radio transceivers for backhaul traffic, with one radio transceiver for end-user traffic. Node 16a will also have one input port 52 for receiving traffic from the global IP network 18, and one output port 54 for sending traffic to the global IP network 18. Node 16a will require a CIOQ switch of size 4×4, with 16 VOQs and 4 OQs. In total, all 7 nodes in FIG. 7A have 54+16=70 VOQs and 18+4=22 OQs.

The 7 node WMN in FIG. 7A and an 8×8 IQ switch can each be modeled as a constrained queueing system. However, the constrained queueing system graph model G(V,E) for the WMN in FIG. 7A is not topologically equivalent to the constrained queueing system graph model of an 8×8 IQ switch. The model for the WMN in FIG. 7A has 70 VOQs and 22 OQs. In contrast, the model for the 8×8 IQ switch has 64 VOQs only. Therefore, it is impossible for the two constrained queueing system models to be equivalent, as they do not have the same number of queues (VOQs and OQs) or servers.

While it is impossible for the constrained queueing system models of the WMN and an 8×8 IQ switch to be equivalent, it is still possible to simplify the WMN model to establish a transformation between the two systems. Specifically, let the switch 81 within each wireless node 12 or 16 in FIG. 7A be an OQ switch 62. The WMN in FIG. 7A will now have 18+4=22 OQs. We can further simplify the WMN model by removing all the transceivers 80 used for the end-user traffic, and by removing all the input ports 52 and all the output ports 54 used for the end-user traffic in the nodes in FIG. 7A. The simplified WMN in FIG. 7A now has 7 nodes each with a 2×2 OQ switch, requiring a total of 14 OQs. The model for a simplified 7-node WMN with 14 OQs is still not topologically equivalent to the model for an 8×8 IQ switch with 64 VOQs. The following discussion will establish that a bipartite graph model corresponding to the simplified WMN is however a subset of a bipartite graph model for an 8×8 IQ switch.

Figure 7B:
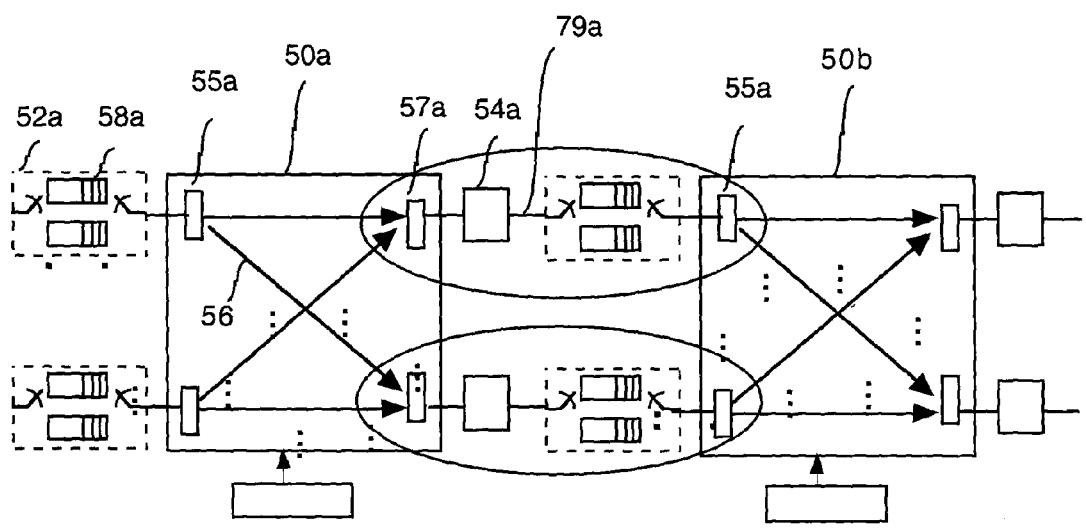
FIG. 7B illustrates 2 side-by-side IQ switches, used to establish a transformation between an N×N IQ switch and an N-node WMN.

The transformation between an IQ switch 50 with 8 nodes and a fully-connected WMN with 7 nodes is illustrated in FIG. 7B. The IQ switch 50 has 8 input ports 52 as shown in FIG. 4A. The fully-connected WMN with 7 nodes 12 and N-squared radio edges 14 used for backhaul traffic is illustrated in FIG. 7B. In a fully-connected WMN, there is a directed radio edge 14 joining every pair of nodes, and there are a total of N-squared directed radio edges 14. To establish the transformation, it is necessary to simplify the WMN model, where the radio transceivers 80, the input ports 52 and the output ports 54 for end-user traffic are removed. We also restrict every node 12 in the WMN to have 2 radio transceivers 80 for backhaul traffic, so that every node can simultaneously transmit in one transceiver 80 and receive on a second transceiver 80, in the (TX,RX) mode. We also do not allow a node 12 to be in the state (TX,TX), where one node simultaneously transmits on two transceivers 80 in one time-slot. We also do not allow a node 12 to be in the state (RX,RX), where one node simultaneously receives on two transceivers 80 in one time-slot.

Consider a single IQ switch 50 with N input ports 52 and output ports 54, where N wires 79 from the N output ports 54 are fed-back and connected to the N input ports 52. These N feedback wires 79 are shown in FIG. 7B, where two IQ switches 50a and 50b are drawn for simplicity, to represent one IQ switch 50. Each node 12 with index j in the WMN is related to the union of several components of the IQ switch with index j. These components are: the output multiplexer block 57, the output port 54, the feedback wire 79, the input port 52 with the N VOQs 58, and the input demultiplexer 55, as shown in FIG. 7B. Referring to FIG. 7B, let the N-squared wires 56 in the IQ switch represent the N-squared radio links 14 between the N nodes 12 in the fully-connected WMN in FIG. 7A. Each output port j of the IQ switch 50 has N incoming wires 56. These N wires 56 become the N incoming radio edges 14 to node j in the fully-connected WMN. Similarly, the N VOQs 58 at input port 52 with index j of the IQ switch 50 become N OQs at the output side of the switch 81 of node 12 with index j of the WMN. The Input Constraints of the IQ switch 50 ensures that each WMN node 12 transmits at most 1 cell per time-slot over a wireless edge 14. The Output Constraints of the IQ switch 50 ensures that each WMN node 12 receives at most 1 cell per time-slot over a wireless edge 14. Effectively, the input constraints of the IQ switch 50 become the output constraints on the WMN. Similarly, the output constraints of the IQ switch 50 become the input constraints on the WMN.

A uniform WMN with N nodes has at most N-squared radio edges 14 between nodes for backhaul traffic, and therefore the N×N IQ switch 50 has enough internal links 56 to model this extreme case of a fully-connected WMN with N-squared directed radio edges 14. In practice, most N-node WMNs will have far fewer than N-squared radio edges 14 for backhaul traffic.

The traffic requirements to be met by an IQ switch can be specified in an admissible traffic demand matrix as established in FIG. 5B, and this traffic demand matrix can be represented by a weighted bipartite graph as shown in FIG. 5A. To exploit the above transformation, the traffic demand matrix of the WMN must be converted to a traffic demand matrix for an IQ switch. The WMN has a traffic demand matrix D1, where element D1(j,k) specifies the guaranteed traffic rate to be supported for backhaul traffic by the WMN between source node 12 with index j and destination node 12 with index k. Recall from the discussion of FIG. 3 that the traffic demand matrix for a WMN does not contain routing information. As described in FIG. 3C, the traffic demand matrix for the WMN must be processed and converted to a Link Traffic Rate Matrix R, where element R(j,k) specifies the traffic rate to be supported on every wireless edge 14 between nodes j and k. This Link Traffic Rate Matrix will then have the same meaning as the traffic demand matrix for an IQ switch. To compute the link traffic rate matrix R for a WMN, the traffic demand matrix D1 for the WMN must be processed (ie routed), as described in the method in FIG. 3C.

Consider a backhaul traffic flow which traverses L directed radio edges 14 in a WMN. The traffic demand of this traffic flow must be supported by the L directed radio edges of the WMN. Equivalently, the traffic demand of this traffic flow must be supported by L internal wires 56 in the IQ switch 50. The routing of a traffic flow over L directed radio edges 14 in a WMN is equivalent to recirculating the same traffic flow L times through an IQ switch 50. In each pass through an IQ switch 50, the traffic flow L traverses a different internal wire 56, moving from one input port j to an output port k, adding its traffic demand to the existing demand on that internal wire 56 with label (j,k). Therefore, the link traffic rate matrix for a WMN can be used as the traffic demand matrix for an IQ switch, which can be processed to compute the permutations for a TDMA scheduling frame in an IQ switch. These permutations can then be processed to yield a schedule for a TDMA scheduling frame in the WMN.

Examples of the Transformation

Figure 7C:
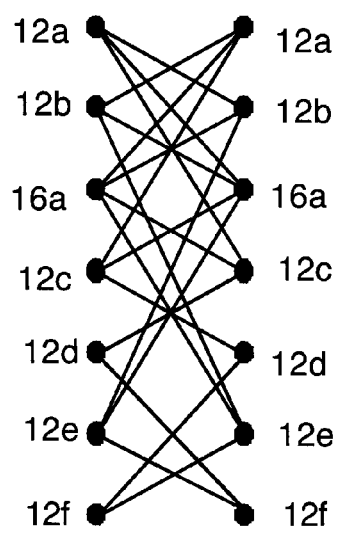
FIG. 7C illustrates a bipartite graph model for the simplified 7-node WMN.
Figure 7D:
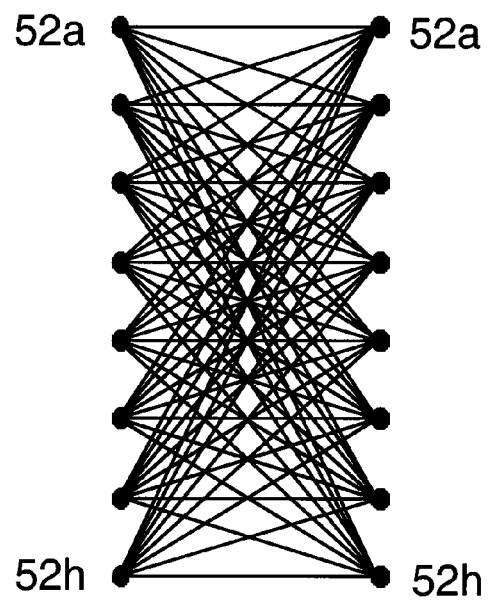
FIG. 7D illustrates a bipartite graph model for an 8×8 IQ switch.

FIG. 7C illustrates a bipartite graph for the simplified WMN in FIG. 7A with N=7 nodes. There are 7 nodes on each side of the bipartite graph. FIG. 7D illustrates a bipartite graph for an 8×8 IQ switch. There are 8 nodes on each side of the bipartite graph. The bipartite graph in FIG. 7C is a subset of the bipartite graph in FIG. 7D. Therefore, the permutations in a TDMA schedule for the 7-node WMN can be obtained from the permutations for a TDMA schedule for the 8×8 IQ switch. In the IQ switch, the weights assigned to some internal wires 56 are set to zero if these wires 56 represent unused radio edges 14 in the simplified WMN model.

The WMN in FIG. 7A has 7 nodes while the size of the IQ switch which can be efficiently scheduled by the scheduling method in the patent application Ser. No. 11/802,937 is a power of 2, for example an 8×8 IQ switch. However, this inconsistency between the number of nodes in a WMN and the size of the IQ switch is not a problem. To model a WMN with H nodes by an IQ switch, when H is not a power of 2, select the next largest IQ size N such that N is a power of 2 and N>=H. The IQ switch has (N−H) extra nodes relative to the H-node WMN and 2N(N−H) extra radio edges relative to the H-node WMN. The capacity of these nodes in the IQ switch must be 0 and the capacity of these edges must be 0, when routing the traffic flows in the equivalent IQ switch model.

Figure 8A:
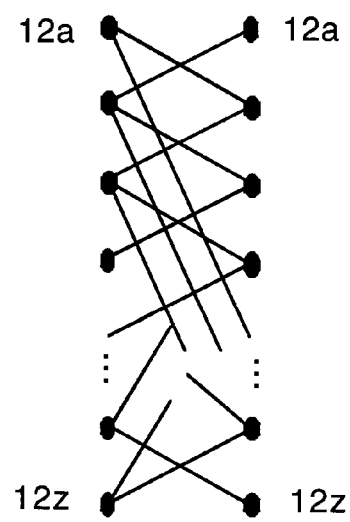
FIG. 8A illustrates a bipartite graph for the simplified WMN model in FIG. 1 with 16 nodes.
Figure 8B:
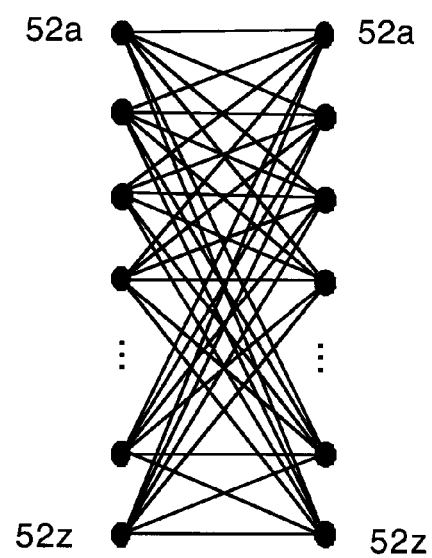
FIG. 8B illustrates a bipartite graph for a 16×16 IQ switch.

FIG. 8A illustrates a bipartite graph for the simplified WMN in FIG. 1 with N=16 nodes. There are 16 nodes on each side of the bipartite graph, and only a subset is shown in FIG. 8A. Each node 12 has ≤6 incoming radio edges 14 and ≤6 outgoing radio edges 14. FIG. 8B illustrates a bipartite graph for a 16×16 IQ switch 50. There are 16 nodes on each side of the bipartite graph, and only a subset is shown in FIG. 8B. The bipartite graph for the simplified WMN model is a subset for the bipartite graph for the IQ switch. Therefore, the permutations in a TDMA schedule for the WMN can be obtained from the permutations in a TDMA schedule for a 16×16 IQ switch. In the IQ switch, the weights assigned to some internal wires 56 are set to zero if these wires 56 represent unused radio edges 14 in the simplified WMN model.

Dynamic Scheduling

In some applications, it may be desirable to compute schedules for the TDMA scheduling frames for backhaul traffic in a WMN dynamically for each scheduling frame. At the each TDMA scheduling frame, each node 12 in a WMN reports the number of backhaul cells which it has queued for each directed radio edge 14 to a central controller. The controller can create a link traffic rate matrix from the reported information. The link traffic rate matrix can be decomposed into a sequence of permutations for the next TDMA scheduling frame, as described earlier. In this mode, there is no concept of longer-term backhaul traffic flows which are maintained for longer periods of time, for example minutes or hours. In this mode, a new TDMA schedule is computed for each TDMA scheduling frame, using the number of queued cells per wireless edge during one time instance to create a dynamically changing link traffic rate matrix, which must be repeatedly processed to yield a sequence of permutations for each TDMA scheduling frame.

FIG. 9: LOW-Jitter Scheduling for WMNs

FIG. 9 illustrates the method Schedule_Matrix_RFSMD. It is based upon the U.S. patent application Ser. No. 11/802,937 filed by T. H. Szymanski, entitled "Method and Apparatus for Scheduling Packets through a Crossbar Switch with Delay Guarantees", which has been earlier incorporated by reference.

The method is invoked in line 100, where it is passed 3 parameters, a matrix M, the scheduling frame length F and the size of the IQ switch N. Line 102 tests to see if the matrix M is admissible. If it is not admissible, processing will stop. On line 104, it calls a method Recursive_Schedule_Matrix. Line 104 returns a frame transmission schedule in a data structure FTS. The data structure FTS has N rows and F columns. Each column j contains a partial or full permutation column vector. Each column vector has length N, and specifies the connections between the input port 52 and output ports 54 of an IQ switch 50 for one time-slot.

The method Admissible is shown in FIG. 9B. In line 110 it accepts a matrix M, a parameter F for the length of the scheduling frame, and a parameter N for the size of the matrix. Lines 114-128 form a loop which processes every row and column of matrix M. Lines 116-120 check if the sum of row j of the matrix M exceeds F. If true, the variable 'result' is set to 0. Lines 122-126 check if the sum of column j of the matrix M exceeds F. If true, the variable 'result' is set to 0. The value of result is returned in line 130. The value of result is 1 if the matrix is admissible, otherwise it is 0.

FIG. 9C illustrates the method Recursive_Schedule_Matrix. In line 82, the method accepts a matrix M, the length of a scheduling frame F, and the size of the matrix N. Line 83 tests to see if the parameter F>1. If true, lines 84-92 are processed. Line 84 defines a new matrix Ma, where each matrix element Ma(j,k) equals the integer part of matrix element M(j,k) divided by 2. Line 85 defines a new matrix Mb, which equals Ma initially. Line 86 defines a new matrix Rem. Each element Rem(j,k)=1 if matrix element M(j,k) is odd. Each element Rem(j,k)=0 if matrix element M(j,k) is even. Therefore, every element of Rem is either a 0 or a 1. Line 87 calls a method partition_matrix, to process the matrix Rem and its size N. The method returns two matrices Ra and Rb, each with the same size as matrix Rem. The method partitions matrix Rem into 2 matrices Ra and Rb, with 3 constraints: Constraint (1) requires that REM=Ra+Rb. Constraint (2) requires that every element of Ra is either a 0 or a 1. Constraint (3) requires that every element of Rb is either a 0 or a 1. The problem of partitioning a matrix into 2 matrices subject to these 3 constraints is problem in the field of combinatorial mathematics. A method to achieve the partitioning is described in the U.S. patent application Ser. No. 11/802,937 by T. H. Szymanski which was incorporated earlier. In particular, the application describes a method called partition_permutation, which partitions a permutation vector which represents a permutation matrix into 2 permutation vectors which represent 2 permutation matrices, subject to the same 3 constraints specified earlier.

Line 88 computes a new value for matrix Ma, where Ma=Ma+Ra. Line 89 computes a new value for matrix Mb, where Mb=Mb+Rb. Matrices Ma and Mb are substantially similar. They each have the same size N×N. Furthermore, the elements have substantially similar numbers. For example, matrix element Ma(j,k) differs from matrix element Mb(j,k) by at most one. Therefore, we may state that Ma(j,k)−Mb(j,k)<=1. We may also state that Mb(j,k)−Ma(j,k)<=1.

The key concept in this method is the use of recursion to partition a scheduling problem into 2 smaller scheduling problems, which can be solved recursively using the same method. More specifically, the scheduling of an admissible matrix M given F time-slots, is partitioned into 2 smaller scheduling problems, to schedule admissible matrix Ma given F/2 time-slots, and to schedule admissible matrix Mb given F/2 time-slots. Line 90 calls the method recursive_schedule_matrix recursively, to compute a schedule for matrix Ma given F/2 time-slots. The method returns the matrix FTSa, which consists of F/2 permutation column vectors of size N. Line 91 calls the method recursive_schedule_matrix recursively, to compute a schedule for matrix Mb given F/2 time-slots. The method returns the matrix FTSb, which consists of F/2 permutation column vectors of size N. Line 92 concatenates the two matrices FTSa and FTSb, to create one larger matrix FTS, which consists of N permutation column vectors of size N. This matrix FTS is returned when the method ends. Line 94 is processed if the parameter F equals one. Since the matrix M is admissible and since F=1, then the matrix M must be a partial or full permutation matrix. In line 94, the method permutation_vector accepts the permutation matrix M and its size N, and returns the equivalent permutation vector. As discussed in FIG. 5, it is more convenient to represent a long sequence of permutations as a sequence of permutation vectors rather than a sequence of permutation matrices, to save memory.

FIG. 9D illustrates the decomposition of a 4×4 traffic demand matrix Ma 136a for a 4×4 IQ switch 50. The matrix 136a is admissible, given a TDMA scheduling frame length of F=16 time-slots. Equivalently, the sum of every row or every column <=16. The matrix 136a is decomposed relatively fairly into 2 substantially similar matrices, Mb 136b and Mc 136c where Ma=Mb+Mc, and where Ma and Mb are each admissible given a frame length of F=8 time-slots. These two matrices Mb 136b and Mc 136c are in turn decomposed to yield 4 substantially similar matrices 136d, 136e, 136f and 136g, where each matrix is admissible given a TDMA scheduling frame length of F=4 time-slots.

FIG. 9E illustrates the decomposition of matrix Md 136d from FIG. 9D in more detail. Matrix Md 136d is decomposed relatively fairly into 2 substantially similar matrices 136h and 136i, which are in turn decomposed into 4 substantially similar matrices 136j, 136k, 136m and 136n. Each of these 4 matrices is a permutation matrix, as described in FIG. 5E. Each permutation matrix represents the conflict-free traffic connections to be established in one time-slot of an IQ switch 50. These 4 matrices represent the 4 permutations to be established in time-slots 0, 1, 2 and 3 of the TDMA scheduling frame for an IQ switch of length 16 time-slots. It is awkward to record all permutation matrices for F time-slots in a TDMA scheduling frame. It is more convenient to record each permutation matrix as a permutation column vector 137, as described in FIG. 5F. A set of 4 permutation column vectors 137(0), 137(1), 137(2) and 137(3) are shown in FIG. 9E, corresponding to the 4 permutation matrices 136j, 136k, 136m and 136n. These column permutation vectors match input ports 52 with indices {0, 1, 2, 3} onto output ports 54 with indices {0, 1, 2, 3} in an IQ switch 50, for time-slots 0, 1, 2 and 3.

FIG. 9F illustrates the sequence of 16 permutation column vectors resulting from the scheduling of the matrix 136a shown in FIG. 9D. By following the recursive scheduling methodology, the original matrix Ma 136a can be eventually decomposed into a sequence of F=16 partial or full permutation matrices, which are recorded as 16 permutation column vectors 137(0) . . . 137(15), which can be called the Frame Transmission Schedule or FTS 138 fir an IQ switch. The FTS is called a low-jitter guaranteed-rate frame transmission schedule for the TDMA scheduling frame for an IQ switch. In the last permutation column vector 137(15), the −1 element indicates that the corresponding input port 52 with index 2 is not matched to an output port 54, in time-slot 16. Observe that the sum of row 2 in the matrix 136a=0+8+2+5=15. Therefore, the input port with index 2 is matched to some output port for 15 out of 16 time-slots, and it is idle in the final time-slot.

The paper by T. H. Szymanski entitled 'A low-Jitter Guaranteed Rate Scheduling Algorithm for Packet-Switched IP Routers" which was incorporated earlier establishes theoretical bounds on the jitter in every end-to-end traffic flow in an IQ switch. A paper by T. H. Szymanski entitled 'Bounds on the End-to-End Delay and Jitter in Input-Buffered and Crosspoint Buffered Switches, which appeared in the IEEE Sarnoff Symposium in Princeton, N.J., April 2009, is hereby incorporated by reference. This paper establishes 4 theorems which demonstrate that all traffic flows routed through a network of IQ switches achieve near-minimal delay and jitter and near-perfect QoS. The same 4 theorems apply to a single IQ switch. By exploiting the transformation between a simplified WMN model and an IQ switch developed in FIG. 7, the same 4 theorems apply to the backhaul traffic flows scheduled in the simplified WMN model.

According to the theorems presented in these two papers, the permutations returned by the method in FIG. 9 will (a) guarantee that the traffic rates specified in the traffic demand matrix for a simplified WMN model are realized by the permutations, (b) will guarantee a near-minimal delay and jitter for all traffic flows specified in the traffic demand matrix for the WMN, (c) will guarantee that the number of queued cells per traffic flow in any Base-Station is near-minimal and bounded, and (d) will guarantee that the queuing delay for any traffic flow in any Base-Station is near-minimal and bounded, thereby ensuring near-perfect QoS for the traffic flow.

Conflict-Free Transmission-Sets in Dual-Channel WMNs

Consider a 2-channel WMN where each node contains 2 radio transceivers for backhaul traffic. Each node 12 can simultaneously send and receive over 2 orthogonal radio channels. The frame transmission schedule 138 computed by the method in FIG. 9 contains the conflict-free permutations of transmitting radio transceivers 80 onto receiving radio transceivers 80 in each time-slot. In other words, the permutations returned from the method in FIG. 9 have already matched transmitting nodes and receiving nodes into pairs for each time-slot. Each permutation ensures that each node 12 transmits at most once in a time-slot, and receives at most once in a time-slot. However, the active edges in the permutations have not been assigned orthogonal radio channels (ie colors). Therefore, every active radio edge 14 in the permutation must be processed and assigned an orthogonal radio channel before it can be used in a WMN.

The active radio edges 14 in a permutation can be assigned radio channels by coloring a graph of the WMN which contains the active edges specified in each permutation. The graph to be colored is the regular graph model for the WMN, for example as shown in FIG. 1 or FIG. 7a, containing only the active edges specified in the permutation. Each active radio edge 14 in the graph must be assigned a color, such that no 2 edges at a common vertex share a color.

According to a classic theorem from the field of graph theory, any planar graph can be colored with at most 3 colors. A planar graph is one where two radio edges 14 never cross over each other. Therefore, the coloring of a planar graph for a WMN can be achieved with at most 3 colors. Therefore, every permutation returned by the method of FIG. 9 can be processed to form a group of between 1 and 3 one-colored transmission sets, if the WMN topology is planar. Each one-colored transmission sets specifies the active edges in one time-slot which are free of primary conflicts and which can be assigned one color. In other words, each one-colored transmission set is a partial permutation matrix, which contains edges which are free of primary conflicts. If the WMN topology is not planar, the method in FIG. 9 can be used with minor adjustment to allow for more than 3 colors, as the coloring of the graph may require more than 3 colors.

Consider a dual channel planar WMN where every node 12 has 2 radio transceivers with access to at most 3 colors for backhaul traffic. Every permutation is processed to form a group of between 1 and 3 one-colorable transmission sets. All 3 one-colored transmission sets from each permutation can be realized simultaneously in the WMN in one time-slot, since there are 2 radio transceivers at each node. In an OFDMA system with 24 orthogonal sub-channels, the 24 orthogonal sub-channels can be grouped into 3 logical radio channels (ie 3 colors). Therefore, each one-colored transmission set can use 1 logical radio channel consisting of 8 OFDMA sub-channels. In the IEEE 802.11 WiFi standard, there are 11 radio channels labeled from 1 to 11, and there are 3 orthogonal radio channels, 1, 6 and 11.

The methods in FIG. 10, FIG. 11A or FIG. 11B can be used to color the permutations returned by the method of FIG. 9. Link utilizations of 100% can be achieved in a 2-channel WMN with 2 radio transceivers for backhaul traffic with access to 3 orthogonal radio channels, since method of FIG. 9 can achieve 100% efficiency.

Conflict-Free Transmission-Sets in Single-Channel WMNs

In a single-channel WMN where every node has one radio transceiver for backhaul traffic, the permutations may have primary conflicts, as the permutations returned by the method in FIG. 9 allow a node to transmit and receive simultaneously at the same time-slot. In a single-channel WMN, a node can only transmit or receive in one time-slot and it cannot do both. Therefore, for a single-channel WMN the permutations must be processed to remove all primary conflicts. In this processing step, each permutation is processed for form a group of conflict-free one-colored Transmission Sets. For a single-channel WMN, this processing of permutations to form groups of one-colored Transmission Sets may increase the amount of jitter in traffic flow slightly, when the jitter is expressed as a number of time-slots. However, the following methods ensure that every permutation is mapped onto a bounded number of one-colored Transmission Sets, so that the jitter, delay and service lag of a traffic flow in a WMN will all remain small and bounded.

FIG. 10: Colour Permutation

In FIG. 10, the method Color_Permutation accepts a permutation vector P and forms a group of between 1 and 3 conflict-free 1-colored transmission sets, where each transmission set can be realized on one color in single-channel WMN in one time-slot. Each transmission set is represented as a partial permutation vector. The method is a greedy algorithm, which processes uncolored edges in a linear order. The method is invoked in line 200, and is passed a permutation P and the length of the permutation N. Line 202 initializes a matrix T with 3 rows and N columns. All elements in T are −1 initially. Each row represents the transmitting nodes in one transmission set with N elements. Line 204 initializes a matrix R with 3 rows and N columns. All elements are −1 initially. Each row represents the receiving nodes in one transmission set with N elements. Lines 206-224 form an outer loop, which visits every node u from 1 to N. Lines 208-222 form an inner loop, which examines the transmitting nodes and receiving nodes on color k, for 3 colors k=1 to 3. Line 206 selects an uncolored source node u from the permutation P. Line 210 initializes the destination node v of the source node u in permutation P. Line 212 tests to see if the destination node v is not transmitting on color k, and if the source node u is not receiving on color k. If both conditions are true, then lines 214-218 are processed. Line 214 assigns node u to be a transmitter to node v on color k in the matrix T. Line 216 assigns node v to be a receiver from node u on color k in matrix R. Line 218 exits the inner loop, as this permutation mapping (u,v) has been colored. The method will continue processing uncolored edges until every edge (u,v) has received a conflict-free color.

In a single channel WMN where every node has one radio transceiver for backhaul traffic, the method in FIG. 10 will achieve link utilizations as high as 67%. Every permutation of N elements has up to N edges. In the best partitioning, each permutation requires 2 colors to be realized in a 1-channel WMN, with N/2 edges assigned to each color. In the worst-case, each permutation requires 3 colors to be realized in a 1-channel WMN. The method in FIG. 10 returns a group of between 2 or 3 one-colored transmission sets per permutation. If we assume each permutation is mapped onto 3 transmission sets requiring 3 time-slots in a TDMA scheduling frame for a WMN, then on average up to 67% of the edges are active in each transmission set. Therefore, the method in FIG. 10 will achieve link utilizations as high as 67% in a single-channel WMN. For 2-channel WMNs, the method can achieve 100% efficiency.

The method of FIG. 10 can be improved by coloring multiple permutations at once and potentially using fewer colors. The method Color_2_Permutations in FIG. 11A illustrates this concept. It will color 2 permutations with 6 or fewer colors. It is a generalization of the method of FIG. 10, which is a greedy graph coloring algorithm, which works on two permutations simultaneously.

In FIG. 11A, the method Color_2_Permutations accepts 2 permutation vectors V1 and V2 of length N and partitions them into between 1 and 6 conflict-free one-colored transmission sets. Each transmission set can be realized in one color by single-channel WMN in one time-slot, and is represented as a partial permutation vector. The method is invoked in line 230, and is passed two permutations V1 and V2, and a parameter N for the length of the permutations. Line 232 initializes a matrix T with 6 rows and N columns. Each row represents the transmitting nodes in one transmission set with N elements. Line 234 initializes a matrix R with 6 rows and N columns. All elements are −1 initially. Each row represents the receiving nodes in one transmission set with N elements. Lines 242-272 form a first outer loop, which processes 2 permutations. Lines 244-270 form a second outer loop, which visits every node j in a permutation, for j=1 to N. Lines 246-268 form an inner loop, which examines the transmitting and receiving nodes on color k, for 6 colors k=1 to 6. Line 248 selects an uncolored source node u from the permutation being processed. Line 246 initializes the destination node v of the source node u in permutation p. Line 252 starts an IF statement and tests to see if the destination node v is not transmitting on color k, and if the source node u is not receiving on color k. Line 254 continues the IF statement, testing to see if the source node u is not transmitting on color k, and if the destination node v is not receiving on color k. Line 256 continues the IF statement, and tests to see if the number of colored edges on color k is less than N. If all conditions are true, then lines 258-264 are processed. Line 258 assigns node u to be a transmitter to node v on color k in the matrix T. Line 260 assigns node v to be a receiver from node u on color k in matrix R. Line 262 increments the number of colored edges on color k. Line 264 exits the inner loop, as this permutation mapping (u,v) has been colored. The method will continue until every edge (u,v) has received a conflict-free color.

When 2 permutations are colored simultaneously, the method in FIG. 11A can improve the link utilization of single channel WMNs to about 80%, from the 67% for the method Color_Permutation in FIG. 10. The method in FIG. 11A can be generalized to process any number H permutations simultaneously, using 3H or fewer colors. In a single-channel WMN using only one color, a permutation is partitioned into 2 or 3 one-colored transmission sets, which can be realized in 2 or 3 time-slots. In a 2-channel WMN where every node has 2 radio transceivers for backhaul traffic, each permutation can be realized in one time-slot if there are 3 available radio channels. If every node has 2 radio transceivers with access to 3 radio channels, then 3 one-colored Transmission sets can be simultaneously realized in one time-slot. Consider a K-channel WMN, every node has K radio transceivers for backhaul traffic, with access to 3K/2 radio channels. The nodes can be saturated by realizing K/2 permutations in each time-slot. Each permutation will generate at most 3 one-colored transmission sets. A set of K/2 permutations will generate at most 3K/2 one-colored transmission sets. If the WMN has 3K/2 colors available, then K/2 permutations will generate at most 3K/2 one-colored transmission sets which can be simultaneously realized in one time-slot using 3K/2 colors.

FIG. 11b: Color Augmenting Path

Both the methods in FIGS. 10 and 11A can be improved to use potentially fewer colors by using a better graph coloring algorithm, based upon an augmenting path. An augmenting path is a sequence of edges which satisfy 2 constraints: (1) every pair of adjacent edges in the sequence share a common node, and (2) every pair of adjacent edges do not share a common color. When an edge (u,v) has been colored, the methods in FIGS. 10 and 11A currently select the next edge (u',v') to be colored by searching the edges in a greedy and linear order starting from node u and searching up until node N, looking for the next uncolored edge (u',v').

An augmenting path algorithm uses a different approach. When an edge (u,v) is colored, the next edge to color (v,y) is incident to the same vertex v if possible. Therefore, when an edge (u,v) is colored, the next edge to color has the form (u',v') where u'=v, if possible. If this is not possible, any uncolored edge is selected for coloring next. FIG. 11B illustrates a method Color_Augmenting_Path. It can color any number H=1, 2, 3, 4 or more permutations at once, using typically fewer colors than the greedy methods. It will require at most 3H colors to color H permutations.

FIG. 11B illustrates an augmenting path graph coloring algorithm to color a set of multiple permutations. The method Color_Augmenting_Path is invoked in line 280. It receives a matrix P with NP rows, where each row represents a permutation vector with N elements. It receives parameters NP=the number of permutations to color, and NC=the number of available colors. Line 281 makes the parameter N visible in the function. In line 282, matrix T has NC rows and N elements per row. Each row in matrix T represents the transmitting nodes in a single one-colored transmission set. All elements are initially idle with a value −1. In line 284 matrix R has NC rows and N elements per row. Each row in matrix R represents the receiving nodes in a single one-colored transmission set. All elements are initially idle with a value −1. In line 286, matrix C has NP rows with N elements per row. Matrix C represents the color of each edge maintained in matrices T and R. In line 286, all the elements of C are initialized to zeros, since all edges are initially uncolored. Line 288 records the number of colored edges on color k in the variable 'num_matches(k)'. Initially the number of colored edges in every color is 0.

Line 290 initializes the permutation index p to be idle by assigning the value −1. Line 290 also initializes the current edge (u,v) to be idle by assigning u and v to be −1. Lines 292-318 form an outer loop which processes permutation p for 1<=p<=NP. Lines 294-316 form an inner loop which processes node j in permutation p for 1<=j<=N. Line 296 tests to see if the current node u is idle, or if the current permutation p has no active edge from u. If either condition is true, then line 298 is processed. In line 298 an uncolored edge is found, by calling the method 'find_uncolored_edge'. The method returns an uncolored edge (u,v) in permutation p. If no uncolored edge exists, all 3 values will be −1.

Line 302 tests to see if p equals −1. If true, then all edges have been colored and the method exits, returning the final matrices T and R. If the test in line 302 is false, then some uncolored edge (u,v) exists. Line 304 finds an unused color c to color the edge (u,v) in permutation p. It calls the method find_unused_color. Line 306 assigns node u to be a transmitter to node v with color c. Line 308 assigns node v to be a receiver from node u with color c. Line 310 indicates that the edge (u,v) in permutation p is colored with color c. Line 312 assigns the destination node v to become the new node u for which an edge is to be colored, thereby augmenting the path.

FIG. 11C illustrates the method find_uncolored_edge. On line 320 it accepts the matrices P and C, the permutation index p, and the nodes u and v of an edge which has been colored. It returns a permutation index p and nodes u and v for an edge which is uncolored. Lines 322-332 form a loop which visit every permutation p for 1<=p<=NP, looking for an uncolored edge starting at vertex u. Line 324 tests to see if an uncolored edge exists from node u in permutation p. If such an edge is found, line 326 assigns node v to be the destination of node u, and the values of p, u and v are returned in line 328. If an edge (u,v) is not found in any permutation p given the source node u, then processing proceeds at line 334. Lines 334 to 348 form an outer loop which will search every permutation p for 1<=p<=P. Lines 336 to 346 form an inner loop which will search every vertex u from 1 up to N, looking for an uncolored edge. Line 338 tests to see an uncolored edge exists in permutation p from node u. If such an edge is found, the destination node v is initialized in line 340, and the values of p, u and v are returned in line 342. If no such edge is found after the loops terminate, then line 350 assigns the values p, u and v to be −1 and returns these values.

FIG. 11D illustrates the method find_unused_color. In line 360, the method receives a permutation p and a vertex u, and the matrixes P and C, and returns a color not already used for any edge incident to node u. The method returns a color which is free of primary conflicts. Lines 366-376 form an outer loop which examines every permutation p. Line 368 checks if permutation p has a colored edge. If true, the color is identified in line 370 and this color is labeled as unavailable in line 372. In line 382, a color to return c is assigned the initial value −1. Lines 384-394 form a loop which visits every color j from 1 to NC. Line 386 tests to see if color j is unused. If true, line 370 assigns the color c to equal j, and line 390 returns the color c. If no color is available, then the value c=−1 is returned when the method ends.

The method in FIG. 11D searches for unused colors in a linear order in the outer loop in lines 384-394, looking for an unused color. The method can be modified to search colors in many other orders. The method can be modified to search for unused colors in a random order. Alternatively, the method can be modified to search for colors in a 'Least Recently Used' order. In this case, a list of colors is maintained according to how recently each color was used. The most recently used color is at the end of the list, and the least recently used color is at the front of the list. The method in FIG. 11D can search the list starting from the least recently used color. When a suitable unused color is found, it is labeled as used and moved to the end of the list, and the color is returned by the method. The least recently used method will tend to reduce secondary interference, by selecting a color which is relatively unused in the neighborhood of an edge to be colored.

Mitigating Secondary Interference

The previous coloring methods in FIGS. 10 and 11A-D color a permutation or a set of permutations at the MAC protocol layer (Media Access Control), without exploring the PHYS protocol layer (Physical). At the Physical layer, many parameters can be adjusted to optimize the system performance. The physical layer optimizations may include Adaptive Modulation and Coding (AMC), where the modulation scheme (BPSK or QPSK) is selected, the forward error correcting (FEC) code is selected, and the transmitter power levels are selected, all to ensure a sufficiently low SINR and a sufficiently low Bit Error Rate and Packet Error Rate. If Adaptive Antenna or MIMO technologies are used, the antenna beamforming parameters can be optimized to realize the transmission sets determined at the MAC layer with minimized transmission power, or with the minimized value of the largest SINR on any active edge. It is possible perform some 'cross-layer' optimizations, where the coloring of the permutations is performed along with the physical layer optimizations, such as the AMC optimization and the MIMO beamforming optimization. In principle, one large optimization problem can be formulated and all parameters can be jointly optimized. However, the solution of large optimization problem can require excessive amounts of computation time.

In the proposed SCA method, the TDMA scheduling frame is recomputed when the backhaul traffic demand matrix changes, or when the physical link performance changes for example due to the weather. A reasonably fast and good coloring method at the MAC layer allows for the reasonably fast computation of all the physical-layer parameters for all the transmission sets in a TDMA scheduling frame, which can be used right away, preferably within one or two TDMA scheduling frames. A cross-layer optimization problem can then be solved over a longer period of time, for example several seconds or minutes. If the optimized parameters are sufficiently better, then these optimized parameters can replace the existing parameters and be used repeatedly for future TDMA scheduling frames. Therefore, it is desirable to have a method which can color the permutations rapidly while considering some physical layer issues.

FIG. 11E—Coloring Under Edge Conflict Set Constraints

The method find_uncolored_edge in FIG. 11D can be modified to process a 'Conflict-Set' for every edge (u,v). A conflict-set of an edge (u,v) can be defined a list of edges which must not use the same color as the edge (u,v). Every edge (u,v) will have its own conflict-set. If no directional antenna technologies are used, then all edges within certain physical distance of an edge e1 may typically be in the conflict set of edge e1. If directional antenna technologies are used, then all directed edges with substantially the same direction within certain physical distance of an edge e1 may typically be in the conflict set of edge e1. If MIMO technologies are used, it is possible that interference from nearby directed edges may be cancelled or nulled out, so that some nearby directed edges are not necessarily in the conflict-set of an edge e1. The conflict set of an edge e1 can found by measuring the interference from other edges, and labeling an edge as conflicting when its interference is excessive. A conflict-set can also be represented as a vector, in the next discussion.

Define a Conflict Matrix CM of size E*E, where E is the number of edges in the WMN. Define a mapping M(u,v) which returns an edge index e for 1<=e<=E for an edge (u,v). Define an inverse mapping IM(e) which returns an edge (u,v) given an edge index e for 1<=e<=E. Every row e in matrix CM is a vector of E elements which identifies the Conflict Set for the edge e1=I(u,v). Element CM(e1,e2)=1 if e2 is in the conflict-set of e1. Element CM(e1,e2)=0 otherwise.

In FIG. 11E, the method find_uncolored_edge2 will select an unused color (orthogonal radio channel) for an edge by processing the conflict matrix CM. In line 400 the method accepts a permutation p, a node ui, and the matrices P and C. Line 401 defines the conflict matrix CM, the number of edges E, the number of colors NC and the number if permutations NP as visible within the method. Line 402 initializes all NC colors as free in the vector free_colors. Lines 403 to 407 form a loop, which processes every permutation p for 1<=p<=NP. Line 404 tests to see if an colored edges exists from node ui in permutation p. If true, then the color is labeled as unavailable in line 405. The loop in lines 403-407 ensures that the returned color is free of primary conflicts, ie the color is not used by any other active edge at node ui.

Line 408 identifies the destination node vi for the source node ui. Line 409 initializes the edge index e1 for the edge (ui,vi). Lines 410-428 form a loop, which processes every edge e2 in the WMN. Line 412 tests to see if edge e2 is in the conflict-set of edge e1. If true, lines 414-424 are processed. Line 414 identifies the vertices (u,v) of edge e2. Lines 416-424 form an inner loop which visits every permutation p. Line 418 tests to see if edge (u,v) is in permutation p and if the edge is colored. If true, line 420 labels the color of edge (u,v) as unavailable for the edge (ui,vi).

After the loop in lines 410-428 has completed, all colors used by colored edges in the conflict set have been identified as unsuitable to color edge (ui,vi). Line 430 initializes a color c to −1 representing an unavailable color. Line 432 initializes a vector RP to be a random permutation of the elements of 1 up to NC inclusive. Lines 434-446 form a loop, which visits every color nc for 1<=nc<=NC in a permuted order determined by vector RP. Line 436 identifies the next color nc to process from the random permutation. Line 438 tests to see if the color nc is available. If true, line 440 assigns the color c=nc and returns. The loop in lines 410-428 examines colors in a random order. However, other orders may be used. For example, the loop may examine colors in a linear order, or in a least recently used order.

FIG. 11F—Coloring Under Channel Interference Constraints

The method find_uncolored_edge2 in FIG. 11E can be further modified to select a color for an uncolored edge which tends to maximize a performance metric such as radio channel quality, or which tends to minimize a performance metric such as Signal-to-Interference-and-Noise ratio (SINR).

Define a Channel-Interference matrix CI of size E*E, where E is the number of edges. Let the matrix element CI(e1,e2) equal the expected SINR at the destination of edge e1 when edge e2 is active, and when all other edges are inactive. If the SINR at the destination of edge e1 depends upon the radio channel assigned to e2, then the matrix element CI(e1,e2) can represent the average SINR observed at edge e1 when all radio channels are considered for edge e2. If MIMO technology is used, the element CI(e1,e2) can represent an estimated SINR that can be achieved once the beamforming parameters and transmission power levels have been assigned and optimized. The matrix CI will change relatively slowly, primarily when the weather changes, and it can be periodically computed for example when the weather changes. The matrix elements may have other means as well, for example each matrix element may represent the transfer function from the transmitted of e2 to the receiver at e1. The transfer function can model the power attenuation and potentially the phase shift.

In FIG. 11F, the method find_uncolored_edge3 will select an unused color (orthogonal radio channel) for an edge by processing the conflict matrix CM and the channel interference matrix CI. In line 450 the method accepts a permutation p, a node ui, and the matrices P and C. Line 451 makes the matrix CM, the number of edges E, the number of colors NC and the number of permutations NP visible within the method. Line 452 initializes all NC colors as free in the vector free_color. Lines 453 to 457 form a loop, which processes every permutation p for 1<=p<=NP. Line 454 tests to see if an colored edges exists from node ui in permutation p. If true, then the color is labeled as unavailable in line 455. The loop in lines 453-457 ensures that the returned color is free of primary conflicts, ie the color is not used by any other active edge at node ui.

Line 458 identifies the destination node vi for the source node ui. Line 459 initializes the edge index e1 for the edge (ui,vi). Lines 460-478 form a loop, which processes every edge e2 in the WMN. Line 462 tests to see if edge e2 is in the conflict-set of edge e1. If true, lines 464-476 are processed. Line 464 identifies the vertices (u,v) of edge e2. Lines 466-474 forms an inner loop which visits every permutation p. Line 468 tests to see if edge (u,v) is in permutation p and if the edge is colored. If true, line 470 records the estimated SINR assuming the color C(p,u) is used to color edge (ui,vi), in the vector element free_color(C(P,u)).The matrix element Cl(e1, e2) provides the estimated SINR observed at edge e1 from edge e2.

Line 480 sorts the vector free_color in ascending order. It returns 2 vectors. Vector SL is a list of sorted SINR ratios in ascending order. Vector IL is a list of the colors sorted in order of ascending SINR. Line 482 assigns the color c the value −1, indicating that no suitable color has yet been found. Lines 484-496 form a loop, which processes every color nc in vector EL in order of ascending SINR. Line 486 assigns the next color nc to the next unprocessed color with the next lowest SINR. Line 488 tests to see if the SINR ratio on edge e1 when this color is used to color edge e1 is less than some threshold value THRESHOLD. If true, line 490 assigns the color c=nc and returns the color c. If no color is found, the color c=−1 is returned after line 496.

The methods in FIGS. 10 and 11 have used vectors or matrices with fixed size as the main data structures, to simplify the presentation. In practice many of the matrices may be sparse, where many elements contain 0s. The methods can be easily modified to process lists of selected nodes or lists of selected edges, which have variable sizes according to how many nodes or edges are in each list.

The methods in FIG. 11E and FIG. 11F assume that an edge is identified by a mapping function between two nodes e1=M(u,v), and an inverse mapping function (u,v)=IM(e1). The definition of the edge set E can be modified to include a tuple (u,v,c), where c denotes a color. The mapping function can be defined as e1=M(u,v,e1), and the inverse mapping function can be defined as (u,v,c)=IM(e1). This change will allow the method to consider the affect of the colors of the colored edges in the conflict set, when selecting a color for an uncolored edge. This option may be useful when radio channels are not substantially orthogonal. For example, the IEEE 802.11 WiFi standard has 11 channels, where channels 1, 6 and 11 are substantially orthogonal, but the other channels have interference. The mapping and inverse functions M and IM can also be expanded to include other parameters.

EXAMPLES

FIG. 12. Wireless Cell with (BS,SS) Communications.

Consider the wireless cell 20 in FIG. 12A. It has one BS node 12a and 3 subscriber stations 26a, 26b and 26c. Assume that no direct communications between the subscriber stations 26 is allowed. An admissible traffic rate matrix for this case is shown in FIG. 12B, assuming a TDMA scheduling frame with F=16 time-slots. Assume that direct communications between the subscriber stations 26 is allowed. An admissible traffic rate matrix for this case is shown in FIG. 12C. Both matrices can be can be scheduled using the method of FIG. 9. The permutations can be processed using the methods in FIGS. 10 and 11, to yield conflict-tree transmission sets for the F time-slots in a TDMA scheduling frame.

The permutations returned by the method Schedule_Matrix_RFSMD in FIG. 9 will guarantee that the traffic rates in the traffic rate matrix are realized, and will guarantee near-minimal delay and jitter, thereby ensuring near-perfect Quality of Service, provided that the radio channel quality is sufficiently high.

FIG. 13: Two Wireless Cells

Assume 2 wireless cells 20a and 20b as shown in FIG. 13A. Assume there are no direct communications between subscriber stations 26. An admissible traffic rate matrix for this system is shown in FIG. 13B. Assume direct communications between the subscriber stations 26 within each cell are allowed. An admissible traffic rate matrix for this system is shown in FIG. 13C.

The method Schedule_Matrix_RFSMD in FIG. 9 can be used to compute the permutations for a TDMA scheduling frame. The permutations can then be colored using the methods in FIG. 10 or FIG. 11.

If each node 12 has 2 radio transceivers, another configuration is to permanently allocate one radio channel for end-user traffic involving subscriber stations 26 within each cell 20, and to permanently allocate another channel for backhaul traffic between nodes 12a and 12b. The end-user traffic in each cell 20a or 20b can be scheduled independently. A link traffic rate matrix is defined for each wireless cell 20, which is processed using the method of FIG. 9, and colored using the methods of FIG. 10 or 11. Alternatively, the end-user traffic in each cell 20 can be scheduled using opportunistic scheduling as discussed in the introduction.

The backhaul traffic between nodes 12a and 12b can also be scheduled independently of the end-user traffic. A 2×2 traffic rate matrix can be defined for these 2 nodes 12a and 12b. The 2×2 matrix can be scheduled using the method Schedule_Matrix_RFSMD in FIG. 9, and can be colored using the methods of FIG. 10 or FIG. 11.

The permutations returned by the method Schedule_Matrix_RFSMD in FIG. 9 will guarantee that the traffic rates in the link traffic rate matrix are realized, and will guarantee near-minimal delay and jitter, thereby ensuring near-perfect Quality of Service, provided that the quality of radio edges 14 is sufficiently high.

Figures 14A, 14B:
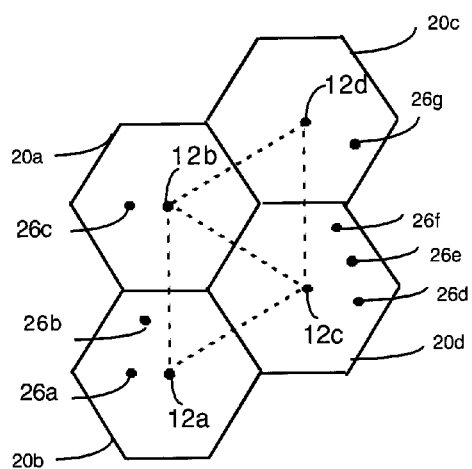

FIG. 14A: 4 Wireless Cells

Assume a WMN system with 4 wireless cells 20, as shown in FIG. 14A. In one configuration, assume there are K radio transceivers per node. Let K1 radio transceivers be allocated for end-user traffic between BS node 12 and nodes 26, and for direct traffic between subscriber stations 26 within each wireless cell. Let K2=K−K1 radio transceivers be allocated for backhaul traffic between nodes 12a, 12b, 12c and 12d. The end-user traffic within each wireless cell 20a, 20b, 20c and 20d can be scheduled independently. One link traffic rate matrix can be created for the end-user traffic within each wireless cell 20a, 20b, 20c and 20d. The 4 matrices for the 4 wireless cells can be scheduled and colored independently, using the methods of FIGS. 9, 10 and 11. Alternatively, the 4 matrices can be scheduled independently into a sequence of permutations, and the permutations could be colored jointly, to minimize interference in between neighboring wireless cells. A traffic rate matrix can also be created for the backhaul traffic between nodes 12 as shown in FIG. 14B. This matrix can be scheduled and colored using the methods of FIG. 9, 10 or 11, independently.

FIG. 15: A 64-Node WMN Example.

In FIG. 1, 16 wireless nodes 12 and 16 are arranged in a conventional hexagonal mesh topology. In FIG. 15, we increase the size of the WMN to have 64 nodes in the same hexagonal mesh topology. A computer program was created to generate an admissible 64×64 traffic demand matrix for the 64-node WMN, which has a heavy link utilization. The traffic demand matrix was routed to create a 64×64 Link Traffic Rate matrix, as described in the method of FIG. 3C. In this example, the point-to-point traffic was randomly generated between pairs of nodes, to result in high utilizations for every radio link 14 and every node 12 or 16. In this example, the average utilization of the radio links 14 is between 90% and 100%. This resulting link traffic rate matrix was processed using the method of FIG. 9. The permutations can be colored using the methods of FIG. 10 or 11.

Figure 15A:
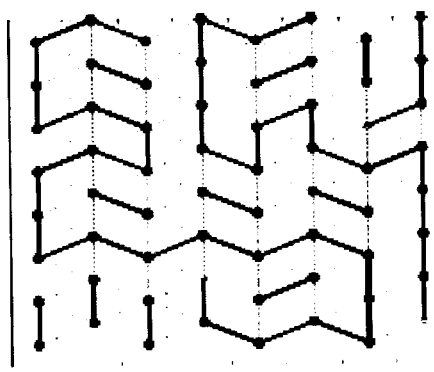
FIG. 15A illustrates the active edges in one permutation for a 64-node WMN with 2 radio transceivers per node for backhaul traffic.
Figure 15B:
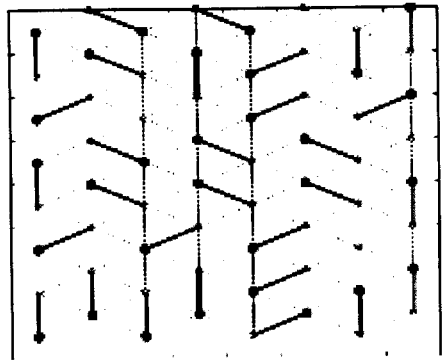
FIG. 15B, 15C and FIG. 15D illustrate three one-colored transmission sets obtained from coloring the permutation.
Figure 15C:
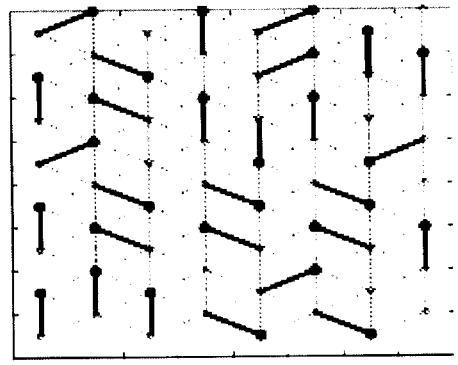
Figure 15D:
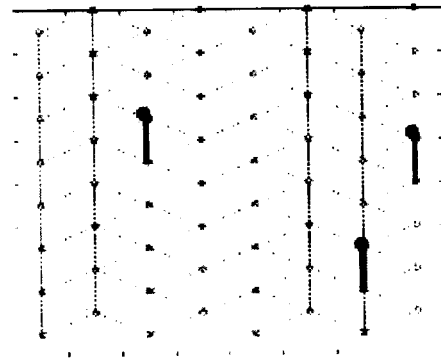
Figure 15E:
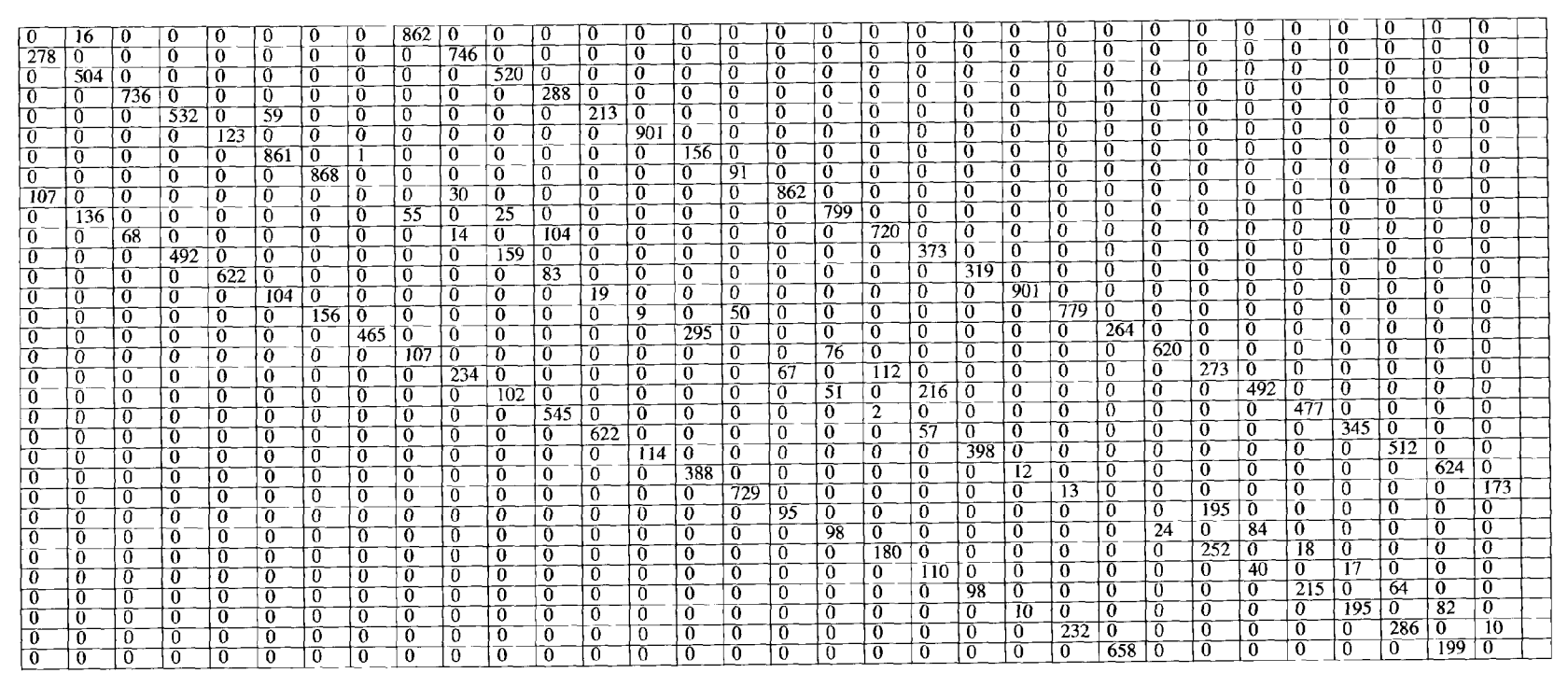

The link traffic rate matrix was decomposed and scheduled using the method Schedule_Matrix_RFSMD in FIG. 9 for a TMDA scheduling frame with F=1024 time-slots, yielding 1024 permutations. The first permutation was colored using the method in FIG. 10, to yield a group of 3 one-colored transmission sets. Each one-colored transmission set can be represented as a partial permutation matrix, or a partial permutation vector, or a list of edges. Assume a dual-channel WMN, where each node has 2 radio transceivers 80 for backhaul traffic and can access any 2 out of 3 orthogonal radio channels. The set of all active radio links 14 between the 64 nodes using all three colors are shown in FIG. 15A. Every node 12 is saturated, and is simultaneously transmitting and receiving in each time-slot. The three one-colored transmission sets returned by the method in FIG. 10 are shown in FIGS. 15B, 15C and 15D. FIG. 15B illustrates a transmission set assigned a first color. The transmission set in FIG. 15B can be represented as a 64×64 partial permutation matrix, or by a partial permutation vector of 64 elements, or by a list of edges. FIG. 15C illustrates a transmission set assigned a second color. The transmission set in FIG. 15C can also be represented as a 64×64 partial permutation matrix, or by a partial permutation vector of 64 elements, or by a list of edges. FIG. 15CD illustrates a transmission set assigned a third color. The transmission set in FIG. 15D can also be represented as a 64×64 partial permutation matrix containing three ones, or by a partial permutation vector of 64 elements, or by a list of 3 edges.

In FIGS. 15A, 15B, 15C and 15D each BS node 12 has 2 radio transceivers and can simultaneously receive and transmit with 2 neighbors. A transmitting node is denoted by a bold circle. A solid line represents an active radio edge from the transmitting node to the receiving node. In each time-slot, the greedy graph coloring algorithm of FIG. 10 was used to process each permutation vector returned by the method in FIG. 9 into a group of three partial permutation vectors.

Adding Extra Links to Create Non-Uniform WMNs

Referring to FIG. 1, a difficult problem with WMNs is the limited capacity of the Gateway BS 16. This problem is now addressed. In FIG. 1, there are 16 wireless cells arranged in a conventional hexagonal WMN. The Gateway station 16 provides access to the global IP network 18. Let each directed radio edge 14 have a fixed data rate. In FIG. 3, the embedding of a communication tree topology from GS 16 to all other BSs 12 is shown. Consider the downward communication tree which delivers traffic from the GS 16 to each BS 12.

FIG. 16A shows a subset of the WMN in FIG. 1. The subset includes the Gateway node 16a, and its 6 neighboring nodes 12. FIG. 16B illustrates one possible link traffic rate matrix for the subset of nodes in FIG. 16A, assuming F=128 time-slots. Observe that the traffic demand in this subset is asymmetrical, ie the downward traffic rate is much larger than the upward traffic rate. The total downward traffic rate leaving node 16 is given by the sum of the row for node 16 in FIG. 16B. The total downward traffic rate leaving node 16 is 24+24+36+0+48+36+24=192 time-slot reservations per scheduling frame. The total upward traffic rate entering node 16 is given by the sum of the column for node 16 in FIG. 16B.

The total upward traffic rate entering node 16 is 4+8+16+0+16+12+8=64 time-slot reservations per scheduling frame.

Let every node 12 and 16 have 2 radio transceivers for backhaul traffic. The link traffic rate matrix shown in FIG. 16B is not admissible, due to the asymmetric traffic demand on the gateway node 16. The node 16 must transmit on 192 time-slots and it must receive in 64 time-slots, in a scheduling frame of length 128 time-slots. The inadmissible link traffic rate matrix cannot be decomposed into a set of permutations by the method in FIG. 9.

This problem can be solved in a few manners.

(1) Add 1 or more extra radio channels to relieve the congestion about the Gateway 16, which operate on distinct radio channels and which are statically configured such that they do not require scheduling.

(2) Add 1 or more extra radio channels to relieve the congestion about the Gateway 16, which operate on shared radio channels such that they do require scheduling.

(3) Process the link traffic rate matrix to make it admissible, compute a sequence of permutations using the method in FIG. 9, and then process the sequence of permutations to handle the asymmetric traffic.

Each option is summarized.

Adding Extra Radio Edges to Create a Non Uniform WMN

Dedicated, statically configured radio edges using dedicated orthogonal radio channels may be added to alleviate the congestion at the Gateway.

In FIG. 17A, let one extra transceiver be added to nodes 16 and 12e. The transceivers operate over one orthogonal radio channel which is un-used by the other nodes in the WMN. These 2 transceivers can statically configured to provide a fixed amount of extra bandwidth in one direction, from node 16 to node 12e, such that no scheduling is necessary. The direction can be changed statically, ie to provide extra bandwidth in the direction from node 12e to node 16 if desired.

IN FIG. 17B, assume 2 extra transceivers be added to nodes 16 and 12e. The transceivers operate over 2 orthogonal radio channels which are un-used by other nodes in the WMN. The 4 transceivers can be statically configured to provide a fixed amount of extra bandwidth in both directions simultaneously, from 16 to 12e and from 12e to 16, such that no scheduling is necessary.

In FIG. 17B, assume one extra transceiver is added to each of nodes 16 and 12e. Assume the transceivers operate over one new orthogonal radio channel which is un-used by other nodes in the WMN. The 2 extra transceivers can also be scheduled to provide X time-slots reservations for extra bandwidth in the direction from 16 to 12e, and Y time-slots reservations for extra bandwidth in the direction from 12e to 16 with the requirement that X+Y<=F. The 2×2 traffic rate matrix between nodes 16 and 12e is shown in FIG. 17C. This matrix contains traffic rates on the extra edges introduced by the extra transceivers. This matrix must be scheduled using the method of FIG. 9, and colored to use the new orthogonal radio channel which has been introduced.

In FIG. 18A, assume one extra transceiver is added to each of nodes 16 and 12e and 12f. The 3 extra transceivers create 6 new edges, as shown in FIG. 18A. The 3×3 traffic rate matrix between nodes 16, 12e and 12f is shown in FIG. 17B. This matrix contains traffic rates on the extra edges introduced by the extra transceivers. Some traffic is migrated from the original traffic rate matrix to the matrix in FIG. 18B, to relieve congestion. The matrix in FIG. 18B must be scheduled using the method of FIG. 9, and colored using the methods of FIG. 10 or 11.

To increase the capacity of the gateway node 16 significantly, one extra radio transceivers can be added to node 16 and to each of its neighbors. The 7 extra transceivers create 24 new radio edges, as shown in FIG. 19A. A traffic rate matrix describing the traffic on the new edges between these nodes is shown in FIG. 19B. Some traffic is migrated from the original traffic rate matrix to the matrix in FIG. 18B, to relieve congestion. The matrix in FIG. 19B can be scheduled using the method of FIG. 10, and colored using the methods of FIG. 10 or 11. These extra radio edges can be used to provide extra bandwidth in the subset of nodes shown in FIG. 19A.

The methodology to schedule non-uniform WMNs can be summarized as follows. The network designers add extra radio transceivers to congested areas of the uniform WMN, creating the non-uniform WMN. A subgraph reflecting the extra radio edges and the incident nodes is created. This subgraph should be uniform. Otherwise, multiple subgraphs can be created such that each one is uniform. Traffic is migrated from the original WMN with the congestion problem, to the subgraphs, so that the link traffic rate matrix for each subgraph is admissible. The admissible matrix can be scheduled using the method of FIG. 9. and colored using the methods of FIG. 10 or 11.

Processing the Link Traffic Rate Matrix to Handle Assymmetric Traffic

The previous approaches require adding extra resources (radio edges and orthogonal radio channels), to achieve an asymmetric and inadmissible link traffic rate matrix. An alternative approach which does not require extra resources is now presented. Call the original link traffic rate matrix in FIG. 16B matrix O. observe that that traffic leaving node 16 requires 192 time-slot reservations in a scheduling frame of F=128 time-slots. The matrix O is inadmissible and cannot be scheduled using the method of FIG. 9. One approach to achieve this asymmetric traffic is to remove bandwidth from the row and add it to the column, to create a new modified link traffic rate matrix called L. In particular, let the link traffic rate on the edge 16 to 12*a* be reduced from 24 reservations to 16 reservations in matrix L, for a reduction of W=8 time-slot reservations. Let the link traffic rate on the edge 12*a* to 16 be increased by W=8 time-slot reservations, from 4 to 12 time-slot reservations, in matrix L. The same technique is used to shift the relevant downward traffic rates in matrix O to the relevant upward traffic rates in matrix L, so that matrix L is admissible. The matrix L is made admissible, and can be scheduled by the method in FIG. 9. The method in FIG. 9 will return a set of F=128 permutations for matrix L. In the set of permutations, a node is never in the states (TX,TX) or (RX,RX), as discussed in the discussion for FIG. 6B.

To achieve the original link traffic rates specified in matrix O, the permutations are processed, and the direction of transmission of selected edges is reversed, to achieve the rates specified in the original link traffic rate matrix O. For example, to achieve matrix L from O, the traffic rate from 16 to 12*a* was lowered by 8 units, and the traffic rate from 12*a* to 16 was increased by 8 units. To achieve the original rates between nodes 16 and 12*a* in matrix O, the permutations are processed, so that the direction of 8 of the edges in which node 12*a* transmits to node 16 are reversed, so that node 16 transmits to node 12*a*. As a result of this reversal, node 16 may enter the (TX,TX) state, and node 12*a* may enter the (RX,RX) state, thereby achieving the original traffic rate specified in matrix O between these two nodes. The same method is applied to the other modified traffic rates to recover all the original traffic rates in matrix O. For a given traffic flow, the edges in which the direction of transmission is reversed are selected in a manner to keep the jitter low.

Quality of Service

Figure 20A:
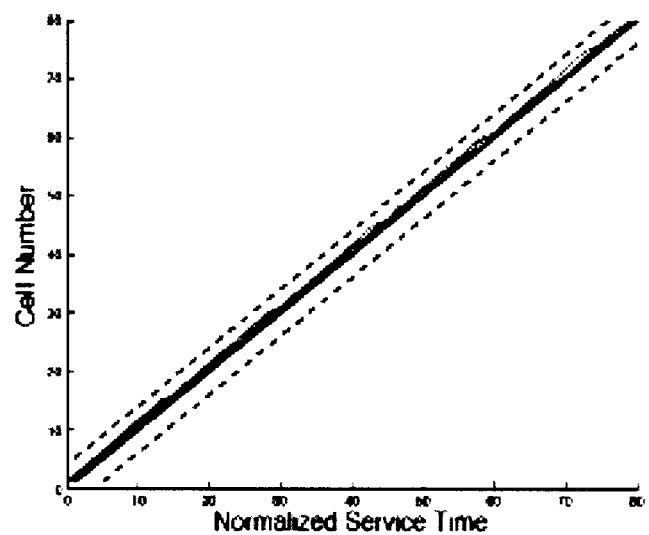
FIG. 20A illustrates the Service Lead-Lag for scheduled traffic flows.

FIG. 20A illustrates the observed normalized service lead/lag curve for every backhaul traffic flow in the 64-node WMN of FIG. 15, with a 64×64 traffic demand matrix with F=1024. The concept of a normalized service lead/lag curve is described in the paper by T. H. Szymanski entitled 'A low-Jitter Guaranteed-Rate Scheduling Algorithm for Packet-Switched IP Routers" which was incorporated earlier. The ideal service curve for any backhaul flow is represented by the main diagonal line in FIG. 20A. Each single line denotes the normalized service times observed for the cells of one specific backhaul traffic flow which traverses its end-to-end path of nodes 12 in the WMN. Consider a traffic flow which requests 10 time-slot reservations in a scheduling frame of length F=128 time-slots. The ideal time between 2 departing cells with zero jitter will equal 128/10=12.8 time-slots. Call this value the 'Ideal Inter-Departure Time' or the IIDT for the traffic flow. In a perfect TDMA schedule, cell 1 will depart at time=1 IIDT, cell 2 will depart at time=2 IIDT, cell 3 will depart at time=3 IIDT, etc. In FIG. 20A, the x-axis equals the time, ie 1 IIDT, 2 IIDT, 3 IIDT, etc. The y-axis represents the cell number in a traffic flow. The service times for consecutive cells in each flow are plotted on FIG. 20A, and joined by a line. The individual service lines for backhaul traffic flows are indistinguishable, due to the large number of service curves plotted on the same graph. However, the observed service curves closely track the ideal service curve (the diagonal). In FIG. 20A, the dashed lines above and below the main diagonal correspond to service leads/lags of 3 cells. The minimum and maximum Normalized Service Lead/Lags are visible from this graph. According to FIG. 20A, the observed Service Lead/Lags are within K cells, for K=3 cells in this example. Therefore, every backhaul traffic flow receives near-perfect service, with a maximum lead or lag of at most 3 cells.

Figure 20B:
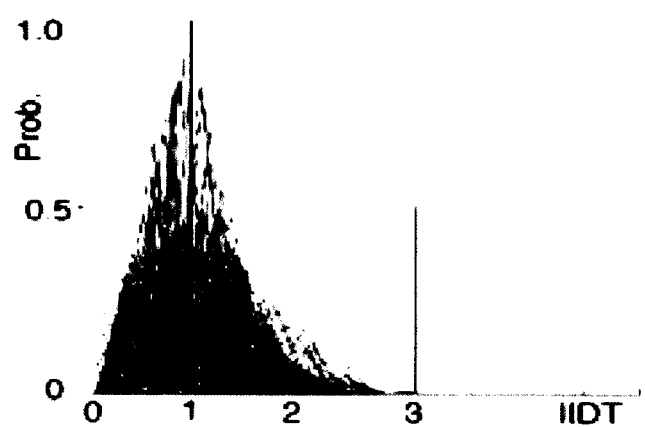
FIG. 20B illustrates the jitter for scheduled traffic.

FIG. 20B plots the experimentally observed Inter-Departure Time (IDT) PDF for cells leaving any BS, based upon a nearly saturated randomly generated 64×64 traffic rate matrix. The ideal IDT will equal one IIDT, as discussed earlier. However, some cells will depart slightly ahead of their ideal departure time, leading to an IDT which is below one IIDT in FIG. 20B. Similarly, some cells will depart slightly behind their ideal departure time, leading to an IDT which is above one IIDT in FIG. 20B. According to Theorem 3 stated earlier, all cells leaving a node 12 will exhibit a service lead/lag of K IIDT. FIG. 20B illustrates this property experimentally.

The average and maximum number of cells per traffic flow queued in every BS node 12 was also recorded by the computer simulator. On average, every GR traffic flow buffers between 1 and 2 cells per traffic flow in each BS node 12, indicating that queuing in minimized. The maximum number of queued cells per backhaul traffic flow in each BS 12 is observed to be <=6 cells, in this simulation. The simulator also verified that no cells were ever dropped for any backhaul traffic flow due to scheduling conflicts.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of scheduling transmission of traffic in a wireless mesh network comprising n nodes, said method comprising:

forming an n×n rate matrix, wherein entries of said n×n matrix define the bandwidth of links between said n nodes;

forming a representation of a sequence of permutation matrices whose sum equals at least said rate matrix, from said rate matrix, wherein each of said permutation matrices represent radio links between said n nodes, and wherein said sequence of permutation matrices defines a sequence of radio links to provide the bandwidth of links between said n nodes;

forming a representation of a sequence of partial permutation matrices, wherein each of said permutation matrices can be decomposed into groups of partial permutation matrices in said sequence of partial permutation matrices, each one of said partial permutation matrices in a group representing non-interfering radio links between said n nodes;

in each timeslot, configuring said n nodes for radio transmission and reception in accordance with at least one of said partial permutation matrices in each group of partial permutation matrices to transmit traffic between said n nodes.

2. The method of claim 1, further comprising repeating said configuring in accordance with sequential ones of said sequence of partial permutation matrices until said n nodes have been configured in accordance with all of said partial permutation matrices in said sequence of partial permutation matrices.

3. The method of claim 2, further comprising repeating said configuring by re-using said sequence of partial permutation matrices.

4. The method of claim 1, wherein at least some of said permutation matrices are represented as a 1×n vector.

5. The method of claim 1, wherein at least some of said partial permutation matrices is represented as a 1×n vector.

6. The method of claim 1, wherein at least some of said permutation matrices are represented as bipartite graphs, graphs, sets or lists of interrelated elements.

7. The method of claim 3, where said forming said representation of said sequence of permutation matrices comprises decomposing said rate matrix using a recursive fair stochastic matrix decomposition algorithm.

8. The method of claim 1, wherein said forming a representation of a sequence of partial permutation matrices comprises forming each group of partial permutation matrices by representing one of said permutation matrices as a graph, and coloring said graph to form said each group of partial permutation matrices.

9. The method of claim 1, where said configuring said n nodes for radio transmission and reception in accordance with at least one of said partial permutation matrices, comprises assigning transmit and receive Frequency Division Multiple Access (FDMA) channels.

10. The method of claim 1, where said configuring said n nodes for radio transmission and reception in accordance with at least one of said partial permutation matrices, comprises assigning transmit and receive Orthogonal Frequency Division Multiple Access (OFDMA) channels.

11. The method of claim 1, where said configuring said n nodes for radio transmission and reception in accordance with at least one of said partial permutation matrices, comprises assigning transmit and receive Code Division Multiple Access (CDMA) channels.

12. The method of claim 1, where said configuring said n nodes for radio transmission and reception in accordance with at least one of said partial permutation matrices, comprises assigning transmit and receive Space Division Multiple Access (SDMA) channels.

13. The method of claim 1, wherein said forming said representation of a sequence of permutation matrices; said forming said representation of a sequence of partial permutation matrices; and said configuring is performed by one control processor.

14. The method of claim 1, said forming said representation of a sequence of permutation matrices; said forming said representation of a sequence of partial permutation matrices; and said assigning is performed at at least one of said m nodes.

15. The method of claim 1, wherein said forming said representation of a sequence of partial permutation matrices comprises, for each represented radio link in a permutation matrix identifying interfering radio links from a channel conflict set, to form one of said partial permutation matrices.

16. The method of claim 1 wherein said forming said representation of said sequence of partial permutation matrices, comprises processing radio links represented in permutation matrix according to an augmenting path, to form each partial permutation matrix.

17. The method of claim 1, wherein said forming said representation of a sequence of partial permutation matrices comprises, for each represented radio link in a permutation matrix, processing a channel interference matrix indicating interference between other radio links, to form one of said partial permutation matrices.

18. A wireless mesh network comprising n nodes, configured in accordance with the method of claim 1.

19. A control processor in a wireless mesh network for performing the method of claim 1.

20. A non-transitory computer readable medium storing processor executable instructions that when loaded at at least one node in a wireless mesh network causes at least one processor to execute the method of claim 1.

21. A wireless mesh network comprising n nodes, and a control processor, said control processor in communication with said n nodes, said control processor operable to:

form a representation of a sequence of permutation matrices whose sum equals at least said rate matrix, from an n×n rate matrix, wherein entries of said n×n matrix define the bandwidth of links between said n nodes, wherein each of said permutation matrices represent radio links between said n nodes, and wherein said sequence of permutation matrices defines a sequence of radio links to provide the bandwidth of links between said n nodes;

form a representation of a sequence of partial permutation matrices, wherein each of said permutation matrices can be decomposed into groups of partial permutation matrices in said sequence of partial permutation matrices, each one of said partial permutation matrices in a group representing non-interfering radio links between said n nodes;

configure in each timeslot, said n nodes for radio transmission and reception in accordance with at least one of said partial permutation matrices in each group of partial permutation matrices to transmit traffic between said n nodes.

* * * * *